(12) United States Patent
Nguyen

(10) Patent No.: US 11,417,237 B2
(45) Date of Patent: Aug. 16, 2022

(54) ROTATABLE LANGUAGE DEMONSTRATION DEVICE

(71) Applicant: Hoang Phan Nguyen, Singapore (SG)

(72) Inventor: Hoang Phan Nguyen, Singapore (SG)

(*) Notice: Subject to any disclaimer, the term of this patent is extended or adjusted under 35 U.S.C. 154(b) by 0 days.

(21) Appl. No.: 17/534,336

(22) Filed: Nov. 23, 2021

(65) Prior Publication Data

US 2022/0165179 A1    May 26, 2022

Related U.S. Application Data

(60) Provisional application No. 63/117,128, filed on Nov. 23, 2020.

(51) Int. Cl.
| | | |
|---|---|---|
| *G09B 1/18* | (2006.01) | |
| *G09B 19/08* | (2006.01) | |
| *G09B 1/02* | (2006.01) | |

(52) U.S. Cl.
CPC .............. *G09B 19/08* (2013.01); *G09B 1/02* (2013.01)

(58) Field of Classification Search
CPC ... G09B 1/08; G09B 1/18; G09B 1/20; G09B 1/22
USPC .................................. 434/168, 174, 206, 402
See application file for complete search history.

(56) References Cited

U.S. PATENT DOCUMENTS

| | | | | |
|---|---|---|---|---|
| 259,920 | A * | 6/1882 | Reiff ....................... | G09B 17/00 434/174 |
| 1,506,210 | A * | 8/1924 | Welty ...................... | G09B 17/00 434/404 |
| 1,581,923 | A | 4/1926 | Henry | |
| 2,370,229 | A * | 2/1945 | Buckley ................. | A63F 9/0811 273/142 HA |
| 2,853,803 | A * | 9/1958 | Exton, Jr. ............. | A63F 3/0457 434/107 |
| 2,988,824 | A * | 6/1961 | Morton .................... | G09B 1/22 434/104 |
| 3,524,645 | A * | 8/1970 | Breslow .................... | A63F 1/06 273/292 |
| 4,109,918 | A | 8/1978 | Mele et al. | |

(Continued)

FOREIGN PATENT DOCUMENTS

| | | |
|---|---|---|
| CN | 203366548 | 12/2013 |
| CN | 204719992 U | 10/2015 |

(Continued)

*Primary Examiner* — Kurt Fernstrom

(57) ABSTRACT

A rotatable language demonstration device is an apparatus that is used to teach languages easily and efficiently in a dynamic and engaging manner to accommodate different learning styles of the students. The apparatus may include at least one demonstration mechanism, a plurality of display tiles, and an elongated frame. The at least one demonstration mechanism provides multiple surfaces for the user to write on without having to erase and rewrite the already written content. The plurality of display tiles enables the quick editing of the written content on the at least one demonstration mechanism. The elongated frame supports the at least one demonstration mechanism in an upright orientation so that the writable surfaces of the at least one demonstration mechanism are easily reachable by the user. The at least one demonstration mechanism includes a plurality of turnable wheels that enables the easy rearrangement of the writable surfaces.

19 Claims, 33 Drawing Sheets

(56) References Cited

U.S. PATENT DOCUMENTS

| | | | | |
|---|---|---|---|---|
| 4,313,727 A * | 2/1982 | Hults | ............... | G09B 19/22 434/174 |
| 4,389,193 A * | 6/1983 | Phillips | ............... | G09B 17/00 434/174 |
| 4,834,657 A * | 5/1989 | Gonzalez | ............... | G09B 1/22 273/142 R |
| 5,640,774 A * | 6/1997 | Goldman | ............... | G06C 3/00 33/1 SD |
| 5,653,595 A * | 8/1997 | Brown | ............... | G09B 19/12 434/174 |
| 5,709,552 A * | 1/1998 | LeGrange | ............... | G09B 15/007 434/404 |
| 5,727,949 A * | 3/1998 | Bar-Or | ............... | G09B 23/28 40/491 |
| 5,993,218 A * | 11/1999 | Kapell | ............... | G09B 1/08 428/900 |
| 6,031,172 A * | 2/2000 | Papadopoulos | ............... | G09B 15/004 84/470 R |
| 6,358,059 B1 * | 3/2002 | Li | ............... | E02D 31/00 434/167 |
| D493,199 S * | 7/2004 | Cowgill | ............... | D21/392 |
| 6,899,335 B2 | 5/2005 | Wilson | | |
| 7,141,731 B2 | 11/2006 | Vallerry | | |
| 7,287,755 B1 | 10/2007 | Kershner | | |
| 7,314,179 B1 * | 1/2008 | Halbur | ............... | G07F 7/08 235/487 |
| 7,354,070 B2 * | 4/2008 | Polick | ............... | G09B 1/22 281/15.1 |
| 7,651,392 B2 | 1/2010 | Pennington et al. | | |
| 8,459,999 B2 * | 6/2013 | Washington | ............... | G09B 5/06 434/174 |
| 9,076,346 B2 * | 7/2015 | Quattrocchi | ............... | G09B 15/023 |
| 10,276,063 B1 * | 4/2019 | Usi | ............... | G06C 1/00 |
| 10,878,720 B1 * | 12/2020 | Omidi | ............... | A63F 9/0613 |
| 2006/0073450 A1 * | 4/2006 | Dyer | ............... | G09B 1/22 434/236 |
| 2006/0177798 A1 * | 8/2006 | Dworman | ............... | G09B 19/165 434/29 |
| 2009/0274014 A1 * | 11/2009 | Al-Jafar | ............... | G09B 1/22 368/232 |
| 2011/0020775 A1 * | 1/2011 | Cecil | ............... | G09B 1/22 434/172 |
| 2017/0337832 A1 * | 11/2017 | Janssen | ............... | G09B 19/00 |

FOREIGN PATENT DOCUMENTS

| | | |
|---|---|---|
| CN | 207367397 | 5/2018 |
| CN | 209674554 | 11/2019 |
| KR | 200299359 | 1/2003 |

* cited by examiner

ROTATABLE LANGUAGE DEMONSTRATION DEVICE

The current application claims a priority to the U.S. provisional patent application Ser. No. 63/117,128 filed on Nov. 23, 2020.

FIELD OF THE INVENTION

The present invention generally relates to education tools and demonstration apparatuses. More specifically, the present invention is a rotatable language demonstration device that enables a dynamic method of teaching languages, particularly foreign languages.

BACKGROUND OF THE INVENTION

Whiteboards are commonly used in academic settings for teachers to convey information to students. In a language classroom, the teacher often writes words, sentences, and explanations on the whiteboard to convey the teachings to the students. However, there are many disadvantages with the whiteboards currently used. Whatever the teacher writes on the board is fixed in its location and cannot be shifted to another location. If the teacher wants to join words on the board to create different sentences, the teacher often must write out each sentence in full. If the sentence needs to be modified, the teacher may have to rewrite many of the words or even the full sentence. Further, once there is not enough space on the whiteboard, the teacher would need to erase the contents already written to make room for writing new content. These repeated acts of writing, rewriting, and erasing is not efficient and takes time from the lesson.

In addition to the whiteboards, many other educational tools are used in language teaching, such as printed materials. For any given language course, multiple printed material is used in language lessons, such as a teacher's book, the student's books, the students' workbook/exercise books, and the test books. All these printed materials largely contain the same words and sentences taught in the program. As such, there is a significant amount of duplication in this traditional approach of using printed educational materials for language learning. Books share the same constraints with conventional whiteboards in that contents are fixed and non-editable. There is no flexibility in shifting book contents around. The sequence of contents presented in a book is also fixed and cannot be easily adapted for fast learners or slow learners. Another problem with the books is that content updates can be logistically expensive to incorporate, which can occur periodically.

Moreover, successful language learning requires a lot of practice and repetition. However, the design of language drills in traditional methodologies may be ineffective because repetition exercises are often framed within narrow contexts. Thus, most learners find these repetitive exercises boring. In addition, language courses and teaching methods may not track nor measure the learner's fluency development numerically. Furthermore, language programs rarely contain gamification elements to enhance the learners' engagement. Therefore, there is a need for a new and improved rotatable language demonstration device that is not restricted by the limitations of currently used whiteboards or printed materials. There is also a need for a new and improved rotatable language demonstration device that enables the implementation of a dynamic teaching methodology that utilizes gamification to engage learners to efficiently learn a new language.

SUMMARY OF THE INVENTION

The present invention is a new and improved rotatable language demonstration device. The rotatable language demonstration device is a writable apparatus with multiple turnable wheels that can be spun individually. Each of the turnable wheels has a writable surface and magnetic surface. On the writable surface, the user can easily write, edit, attach, or remove language contents easily, such as contents printed on magnetic flashcards. The present invention is supported by an elongated frame that positions the present invention in an upright orientation for the user to easily write on the multiple turnable wheels. A base dock or a mount can be provided to retain the present invention for storage or for easy manipulation during a lesson. Further, multiple smaller wheel sets or writing boards can be included to provide additional writable surfaces for the user to write on. In addition, the present invention can include multiple display tiles that can be attached onto the turnable wheels. Each of the display tiles also has a writable surface, and each display tile is magnetized for easy attachment to the turnable wheels. The present invention can include a tile-retaining receptacle to readily hold the display tiles so that the display tiles are readily available to the user. Additional features and benefits of the present invention are further discussed in the sections below.

DETAIL DESCRIPTIONS OF THE INVENTION

Figure 1:
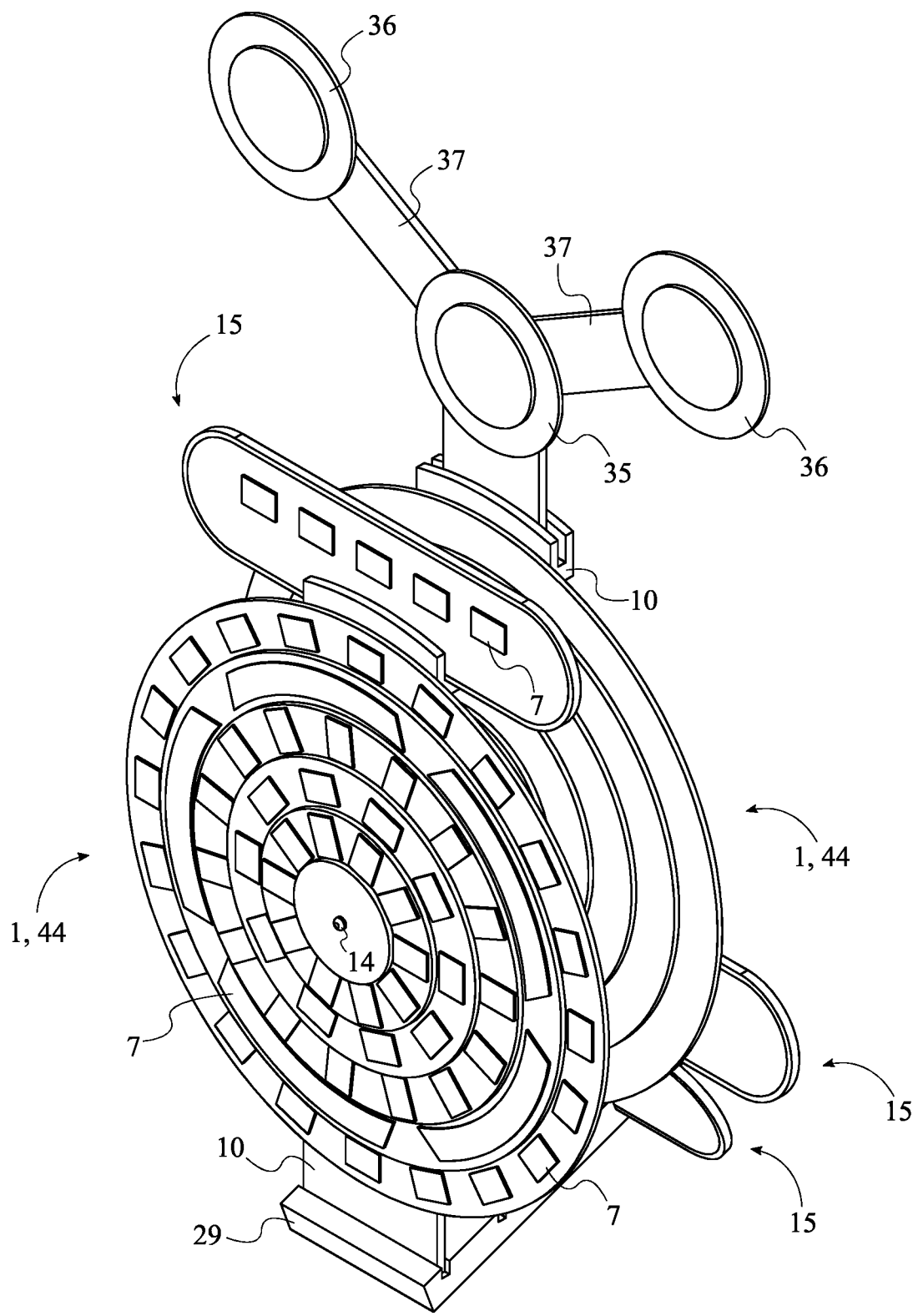
FIG. 1 is a top front perspective view of the present invention, wherein multiple units of the present invention are shown mounted onto the base dock.

All illustrations of the drawings are for the purpose of describing selected versions of the present invention and are not intended to limit the scope of the present invention.

The present invention is a rotatable language demonstration device that is used to teach languages easily and efficiently in a dynamic and engaging manner to accommodate different learning styles of the students. As can be seen in FIG. 1 through 6, the present invention may comprise at least one demonstration mechanism 44, a plurality of display tiles 7, and an elongated frame 10. The at least one demonstration mechanism 44 provides multiple surfaces for the user to write on without having to erase and rewrite the already written content. The plurality of display tiles 7 enables the quick editing of the written content on the at least one demonstration mechanism 44. The elongated frame 10 supports the at least one demonstration mechanism 44 in an upright orientation so that the writable surfaces of the at least one demonstration mechanism 44 are easily reachable by the user.

The general configuration of the aforementioned components enables language educators to effectively teach languages to students of different learning capabilities. To enable the quick editing of the written content on the writable surfaces, the at least one demonstration mechanism 44 comprises a plurality of turnable wheels 1. The plurality of turnable wheels 1 provides the user multiple surfaces to write on without the use of other tools. The plurality of turnable wheels 1 also enables the easy rearrangement of the written content on the at least one demonstration mechanism 44. As can be seen in FIG. 1 through 6, the plurality of turnable wheels 1 is preferably multiple turnable wheels of decreasing diameter that are positioned concentric to each other. In addition, each of the plurality of turnable wheels 1 comprises a writable wheel face 2 and a hidden wheel face 3. The writable wheel face 2 preferably corresponds to the surface which the user can write on, while the hidden wheel face 3 corresponds to the surface hidden from view. The writable wheel face 2 is preferably made of a smooth, glossy surface material designed for making non-permanent markings with a non-permanent writing device, such as a non-permanent marker. The writable surface material can include, but is not limited to, polyester laminate, melamine, magnetic paint coating, etc. Further, each of the turnable wheels of the plurality of turnable wheels 1 preferably has a magnetic body that receives magnetic attachments. Moreover, each adjacent wheel pair 4 from the plurality of turnable wheels 1 comprises a diametrically-smaller turnable wheel 5 and a diametrically-larger turnable wheel 6 due to the arrangement of the plurality of turnable wheels 1 in decreasing size. Furthermore, the elongated frame 10 is preferably a thin, long structure strong enough to maintain the plurality of turnable wheels 1 in a generally upright orientation. Accordingly, the elongated frame 10 comprises a first frame end 11 and a second frame end 12 corresponding to the opposing terminal ends of the elongated frame 10.

To assemble the present invention in an operational configuration, a wheel rotation axis 39 is positioned in between the first frame end 11 and the second frame end 12. The wheel rotation axis 39 preferably corresponds to the rotation axis of the plurality of turnable wheels 1. The wheel rotation axis 39 is also positioned perpendicular to the elongated frame 10 so that the rotation of the plurality of turnable wheels 1 is not blocked by the elongated frame 10. Accordingly, each of the plurality of turnable wheels 1 is concentrically positioned with the wheel rotation axis 39. In addition, the writable wheel face 2 is oriented away from the elongated frame 10 while the hidden wheel face 3 is oriented towards the elongated frame 10. The arrangement of the writable wheel face 2 and the hidden wheel face 3 ensure that the writable wheel face 2 is always accessible to the user. Further, to secure the plurality of turnable wheels 1 to the elongated frame 10, each of the plurality of turnable wheels 1 is rotatably mounted to the elongated frame 10 about the wheel rotation axis 39. Thus, each turnable wheel of the plurality of turnable wheels 1 can be rotated individually without interrupting the rotation of the adjacent turnable wheels. Further, to ensure that the plurality of turnable wheels 1 is arranged by decreasing diameter, the hidden wheel face 3 of the diametrically-smaller turnable wheel 5 is positioned parallel and adjacent to the writable wheel face 2 of the diametrically-larger turnable wheel 6. Furthermore, at least one specific display tile from the plurality of display tiles 7 is removably attached onto the writable wheel surface of a selected turnable wheel from the plurality of turnable wheels 1. Thus, the user can attach a desired number of display tiles onto any turnable wheel from the plurality of turnable wheels 1. Then, the user can rearrange the position of the written material by rotating one or more turnable wheels. Finally, the user can also easily edit the written material by attaching one or more display tiles on top of the desired written material without having to erase and rewrite the written material to form new sentences or phrases.

Figure 7:
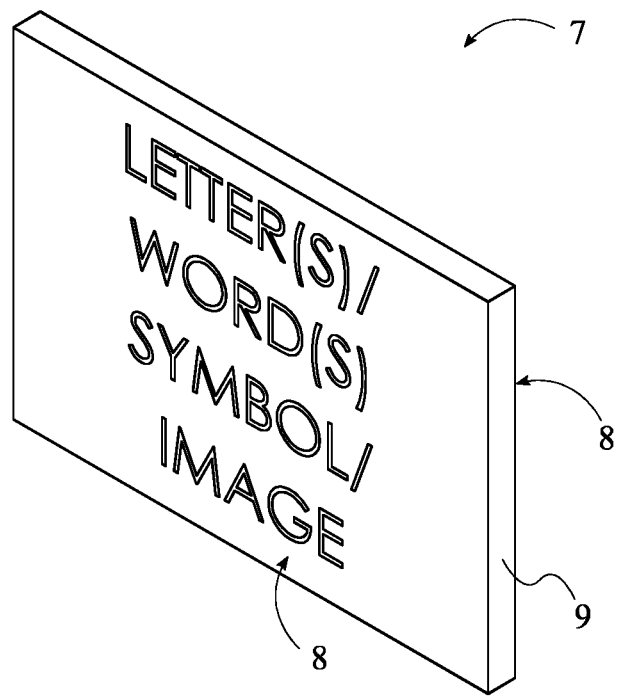
FIG. 7 is a top front perspective view of the plurality of display tiles of the present invention.
Figure 8:
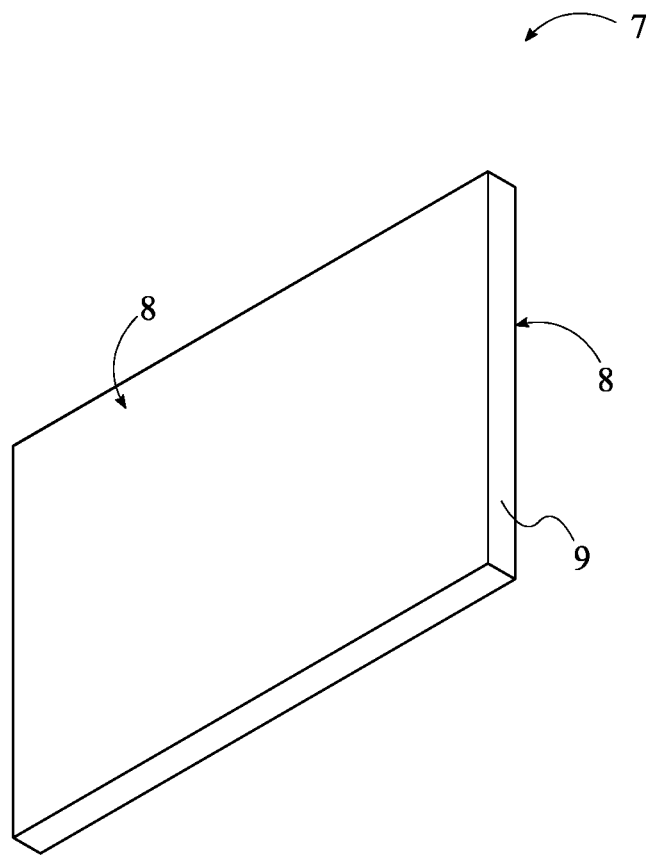
FIG. 8 is a bottom rear perspective view of the plurality of display tiles of the present invention.
Figure 9:
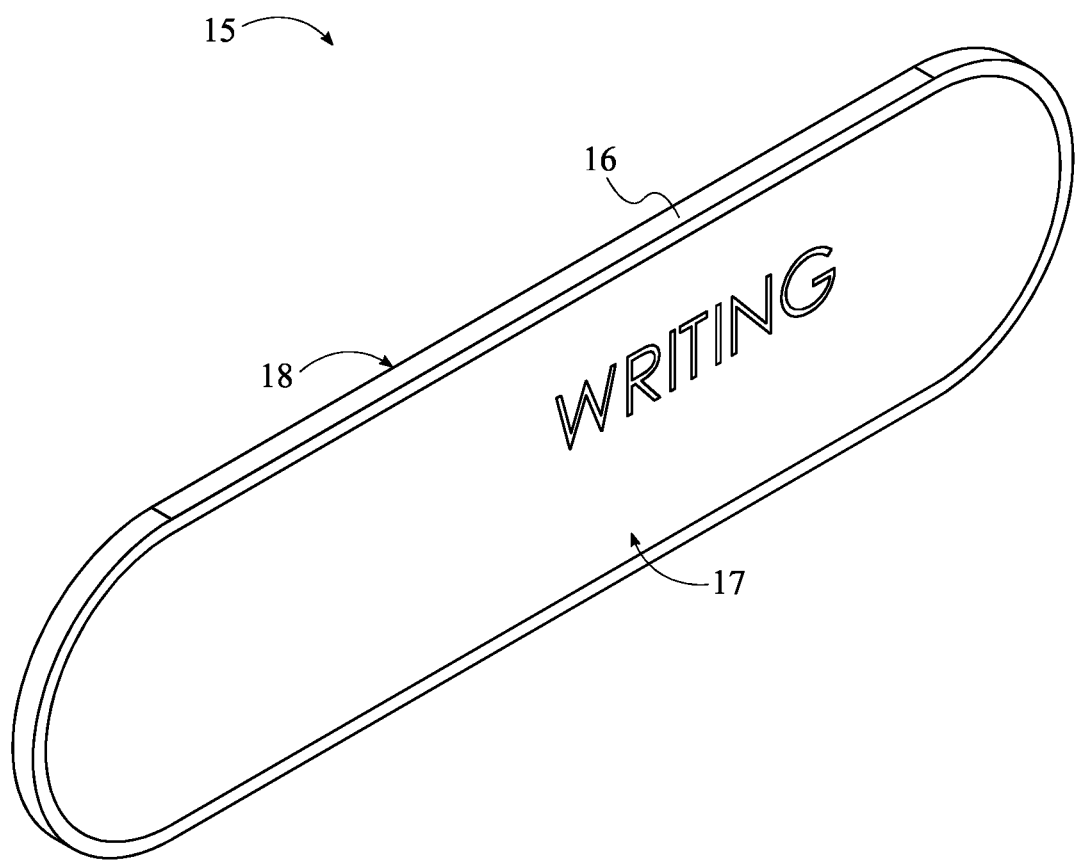
FIG. 9 is a top front perspective view of the at least one secondary board of the present invention.
Figure 10:
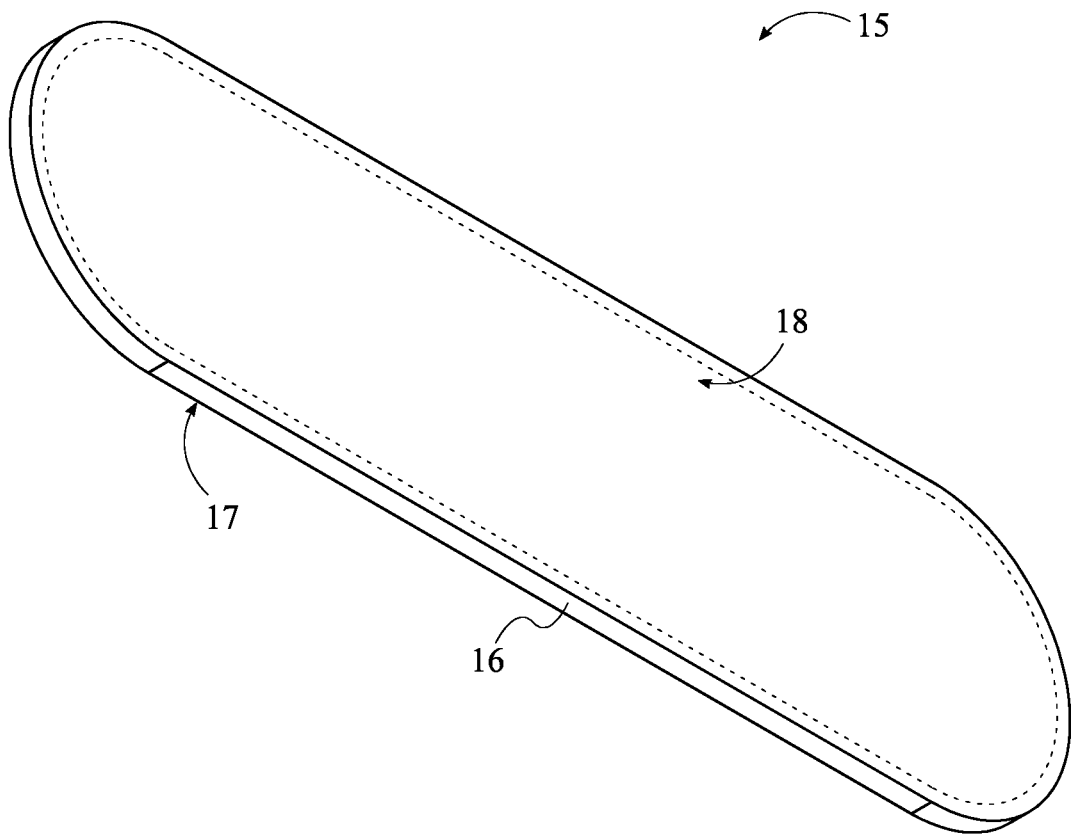
FIG. 10 is a bottom rear perspective view of the at least one secondary board of the present invention.
Figure 11:
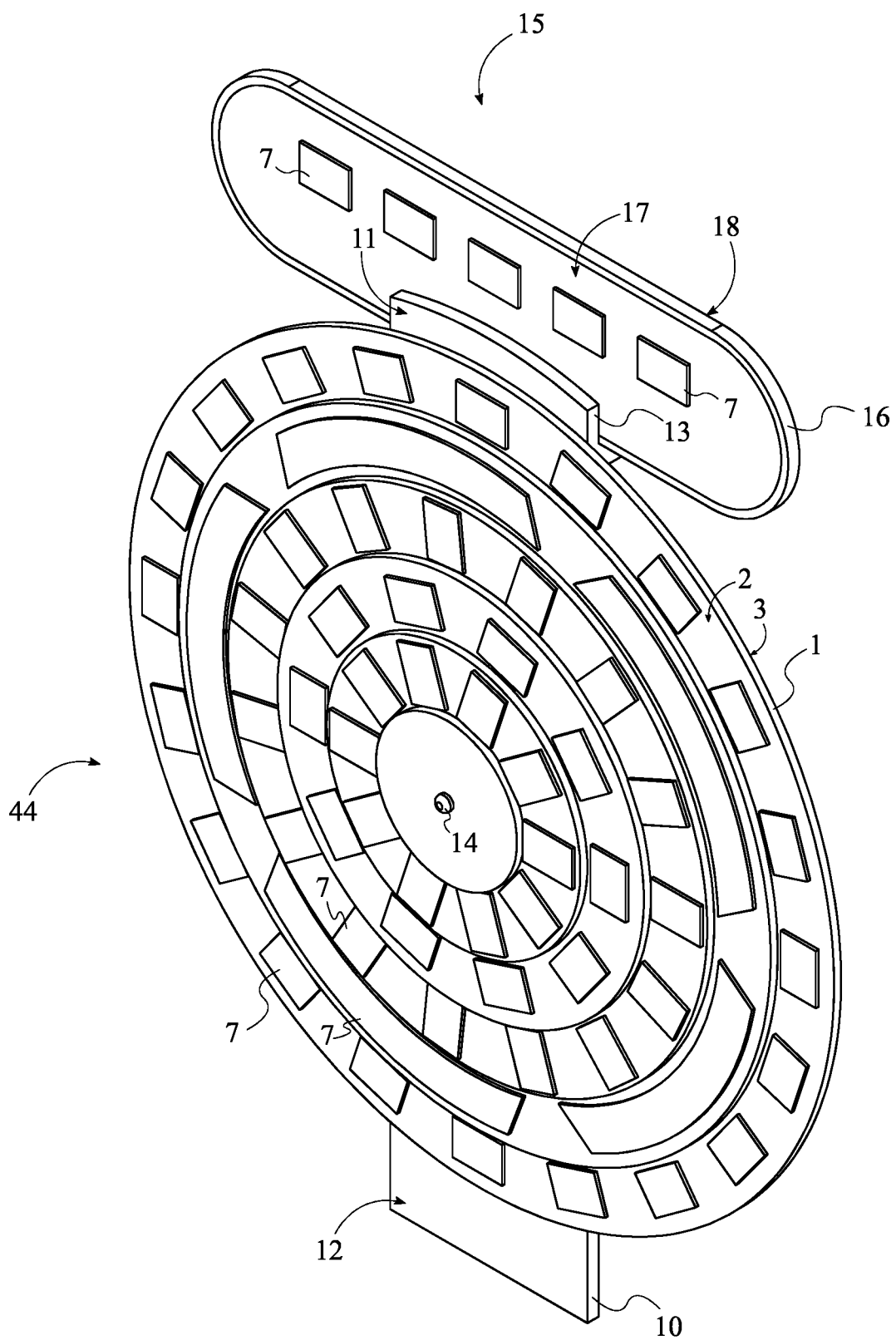
FIG. 11 is a top front perspective view of the plurality of turnable wheels and the elongated frame of the present invention, wherein the at least one secondary board is mounted onto the elongated frame, and wherein the plurality of display tiles is shown attached onto the plurality of turnable wheels and the at least one secondary board.

Similar to the plurality of turnable wheels 1, the plurality of display tiles 7 may also have writable surfaces. So, each of the plurality of display tiles 7 may comprise a pair of tile faces 8 and a magnetized tile body 9, as shown in FIGS. 7 and 8. The magnetized tile body 9 is preferably a thin, rectangular structure large enough to fit on the writable wheel face 2 of each of the plurality of turnable wheels 1. However, in other embodiments, the magnetized tile body 9 can be custom cut to fit the curvature of the corresponding turnable wheel. Basically, the plurality of display tiles 7 can be cut into any shape and contents written on the magnetized tile body 9 can follow any orientation, allowing reading in any direction. The pair of tile faces 8 provides surfaces on which language teaching material can be provided. In addition, due to the thin structure of the magnetized tile body 9, the pair of tile faces 8 is positioned opposite to each other about the magnetized tile body 9. Thus, the user can attach the magnetized tile body 9 by placing either tile face against the writable wheel face 2. Further, at least one tile face from the pair of tile faces 8 is a writable surface which can be made of the same material as the writable wheel face 2 or covered with paper material. The paper material may also be designed as a stacked number of pages that can be discarded after use. Alternatively, the writable surface can be used with external note-taking devices, such as re-adherable pieces of paper commonly known as sticky notes. The double-sided nature of the plurality of display tiles 7 enables the plurality of display tiles 7 to be used as flashcards. For example, one tile face may show the word in the target language being taught, while the other tile face may show the word translated in the student's native language, and/or symbol representing the same idea. In other embodiments, both tile faces are writable surfaces, and the writable surface material can be provided as a permanent or removable coating material.

The present invention helps teach a target language using the Lexical Approach which involves teaching one language concept at a time. The present invention enables educators to teach the students a single concept on a display tile, and then slowly building up into chunks of words and eventually complete sentences. The Lexical Approach posits that learning vocabulary should be central to foreign language learning efforts, and that through repeated patterns of vocabulary combinations the students will be able to abstract the grammar rules. Grammar therefore is taught through pattern exposure without explicit explanation. By selecting predominantly high frequency vocabulary chunks to teach at beginners' level, a small number of words can be combined in many different ways to generate a high number of complete utterances. This dynamism of meaning-making through language is mimicked in the spinning of the plurality of turnable wheels 1 carrying the high frequency display tiles. Moreover, most aspects of a language follow different patterns, including phonetics, word construction, and grammar. Patterns in a language can be taught and practiced on the plurality of turnable wheels 1 with ease, for example, phonetics rules, word prefix and suffix, plural form, verb conjugation, sentence structure, etc. In other embodiments, the plurality of display tiles 7 may be complemented with several display cards which provide a larger area to display longer strings of texts or larger images, given that the plurality of display tiles 7 predominantly display individual words or phrases.

To provide additional writable surfaces for the user to write on, the present invention may comprise at least one secondary board 15. As can be seen in FIG. 9 through 12, the at least one secondary board 15 comprises a board body 16, a writable board face 17, and a hidden board face 18. The board body 16 is preferably an elongated thin structure that is large enough to provide additional writing surfaces for the user. Due to the thin structure of the board body 16, the writable board face 17 and the hidden board face 18 are positioned opposite to each other about the board body 16. In addition, to secure the board body 16 to the elongated frame 10, the board body 16 is attached adjacent to the first frame end 11. This positions the at least one secondary board 15 on top of the plurality of turnable wheels 1 so that the user may write important lesson notes or other lesson-related material, keeping such contents in view while not having to hold up the board. The writable board face 17 is preferably made of writable and/or magnetic material, including magnetic paint, so that the user can attach the plurality of display tiles 7 onto the at least one secondary board 15 as well. In other embodiments, the hidden board face 18 may also be writable and magnetic. That way the at least one secondary board 15 can be conveniently and neatly stowed at the back of the elongated frame 10 where a magnetic patch can be attached. Two of such magnetic patches are preferably affixed to the back of the elongated frame 10.

Figure 12:
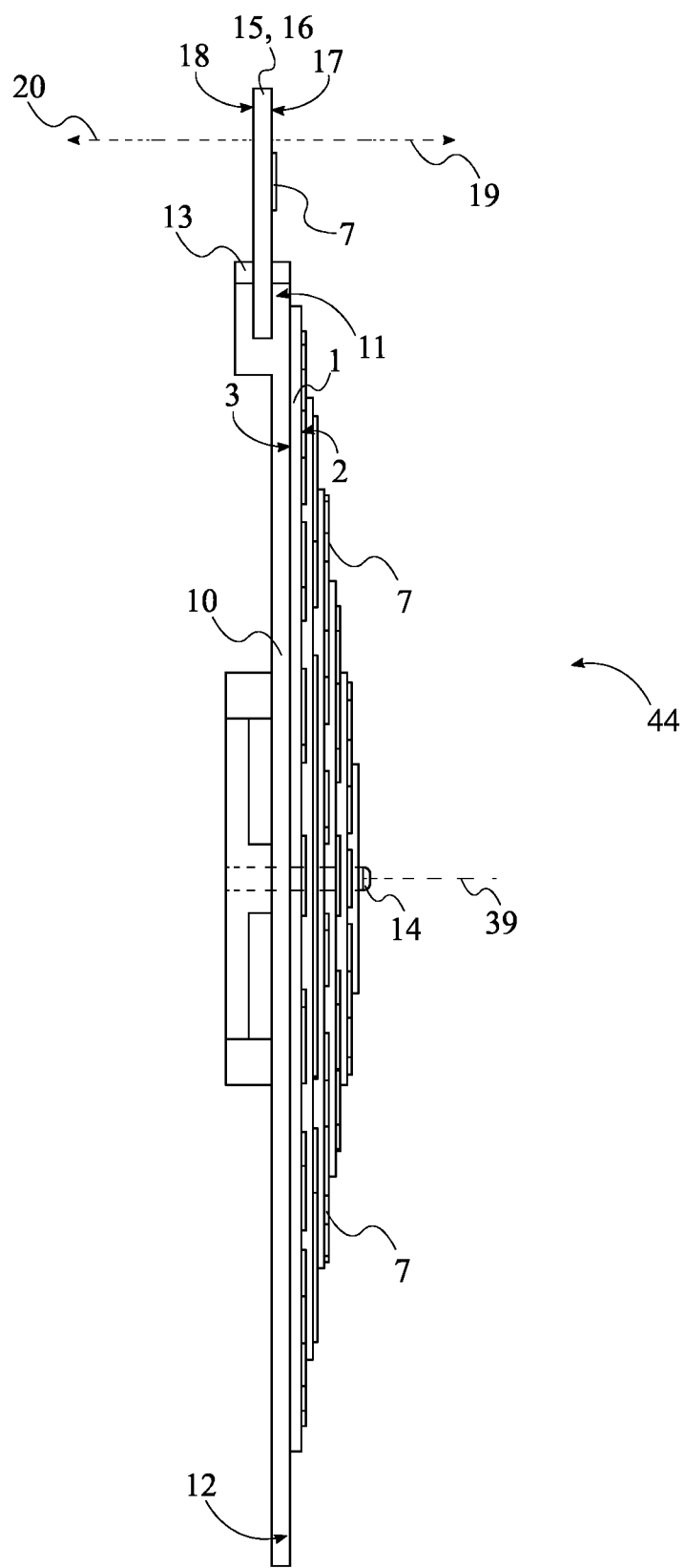
FIG. 12 is a side view of the plurality of turnable wheels and the elongated frame of the present invention, wherein the at least one secondary board is mounted onto the elongated frame, and wherein the plurality of display tiles is shown attached onto the plurality of turnable wheels and the at least one secondary board.
Figure 13:
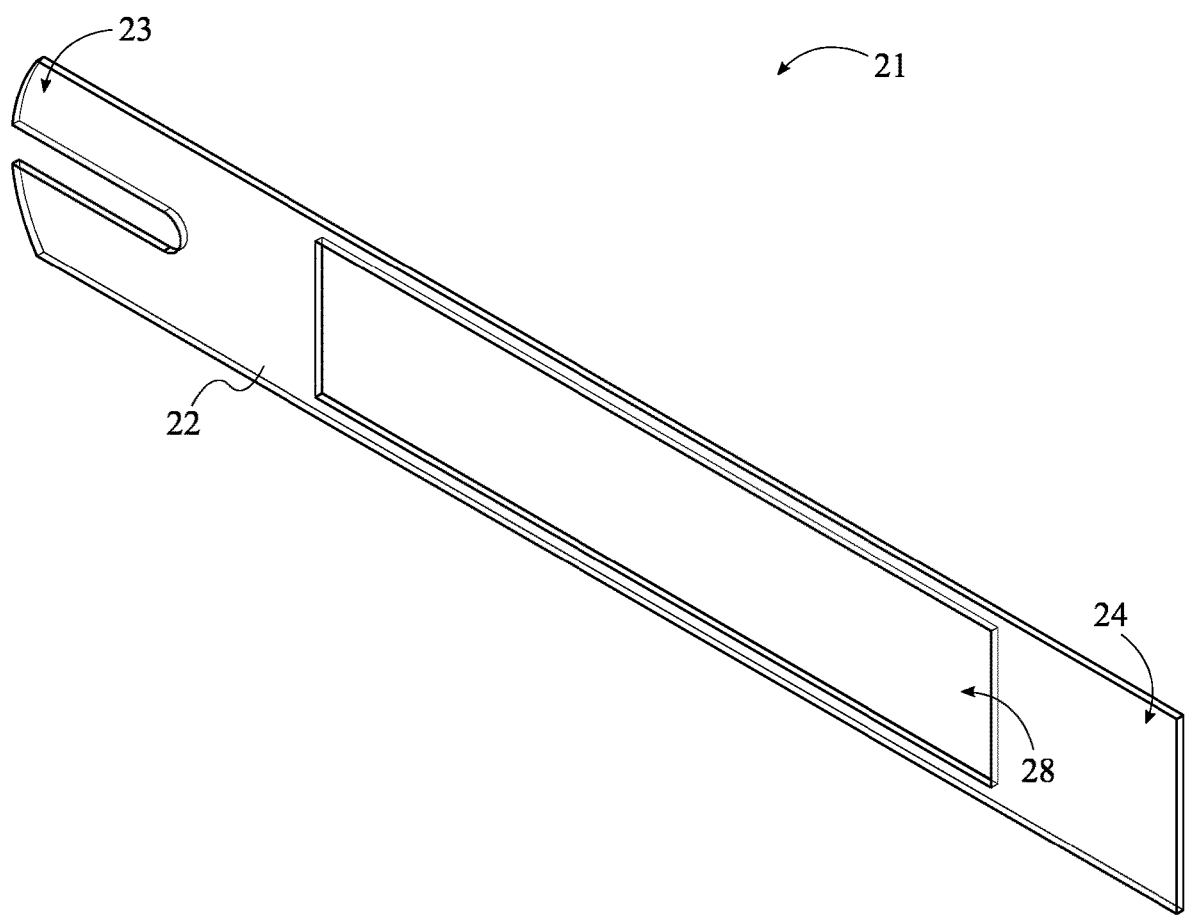
FIG. 13 is a top front perspective view of the positioning panel of the at least one focusing window assembly of the present invention.
Figure 14:
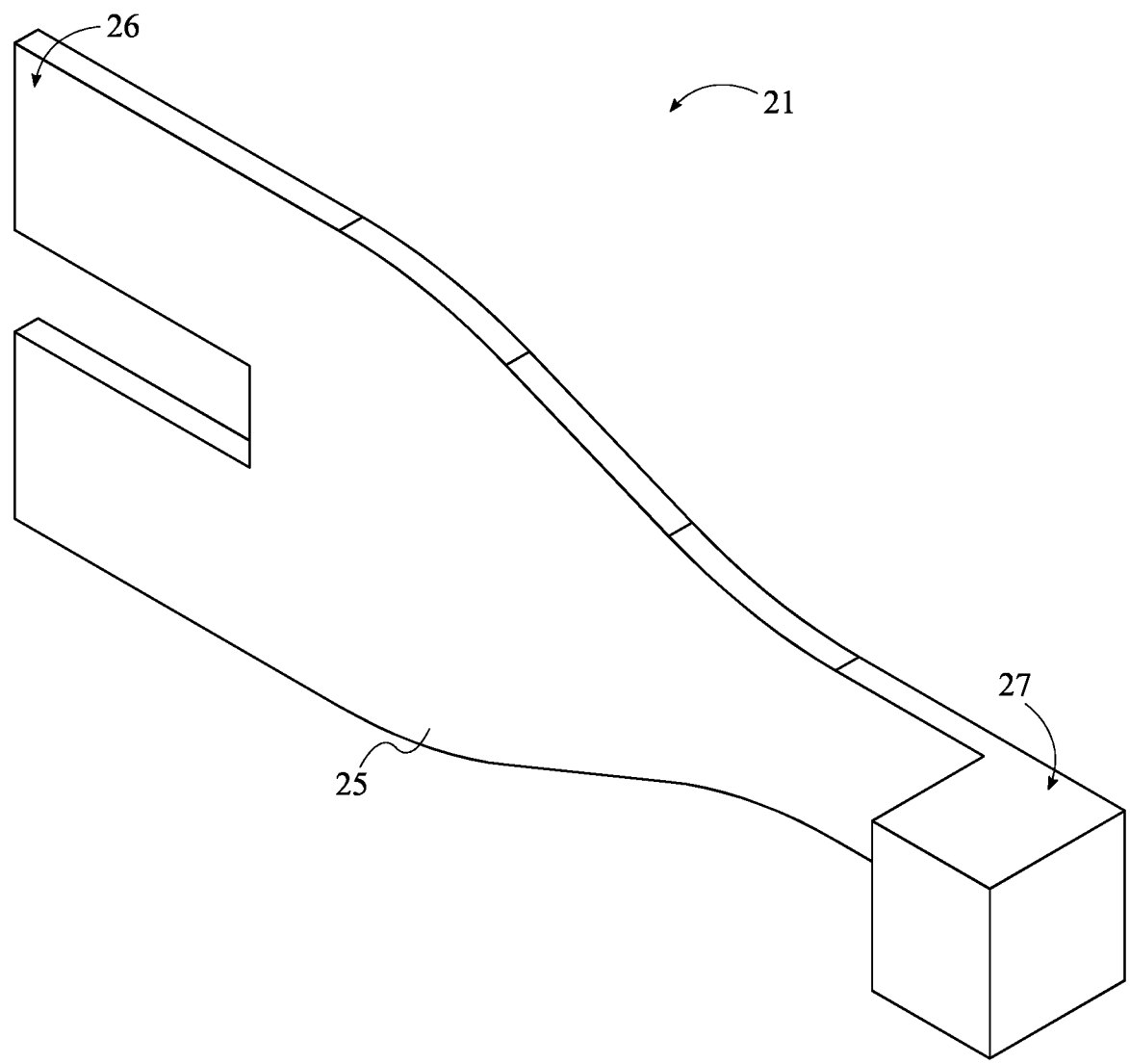
FIG. 14 is a top front perspective view of the support arm of the at least one focusing window assembly of the present invention.
Figure 15:
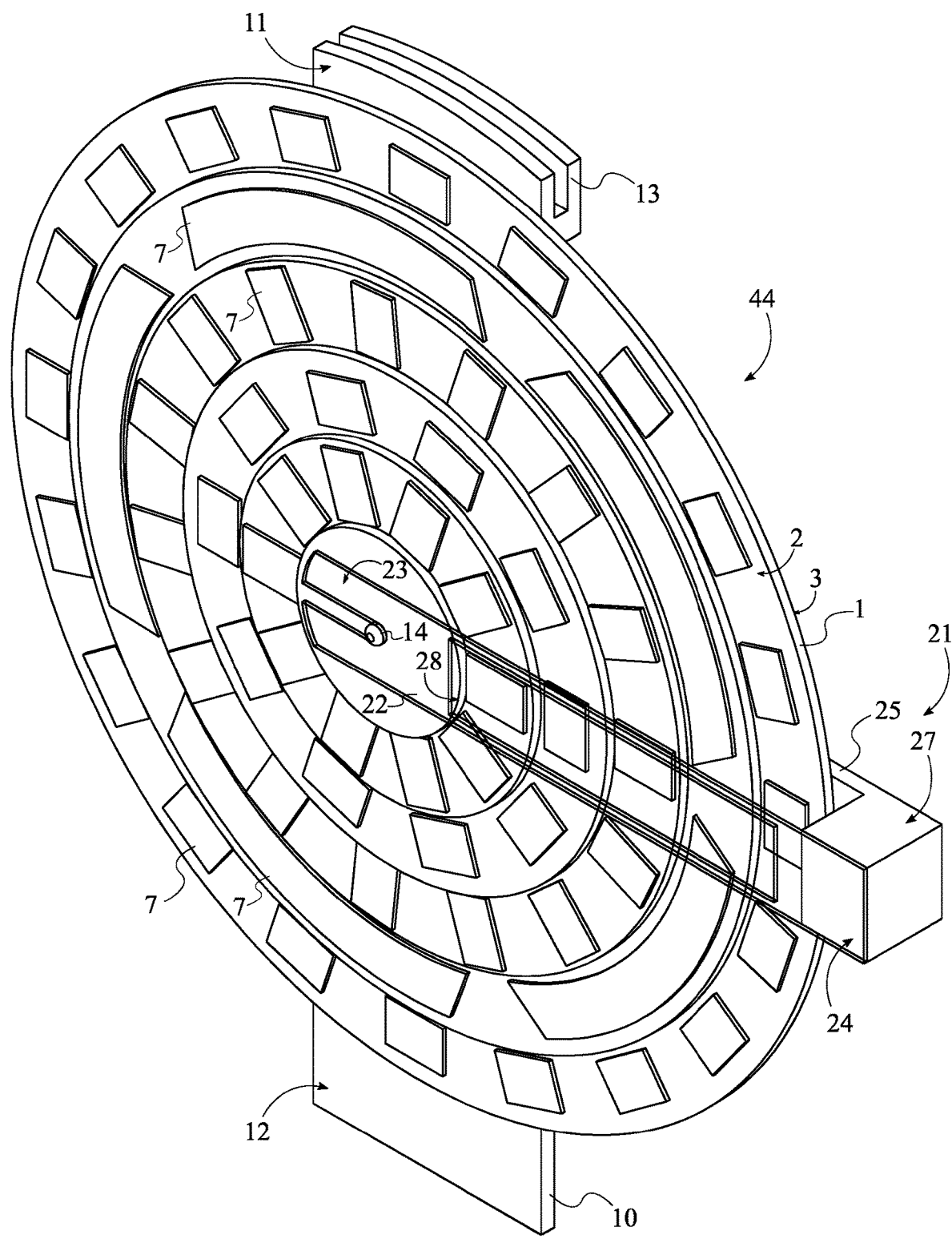
FIG. 15 is a top front perspective view of the at least one focusing window assembly of the present invention, wherein the positioning panel and the support arm are shown mounted onto the plurality of turnable wheels and the elongated frame.
Figure 16:
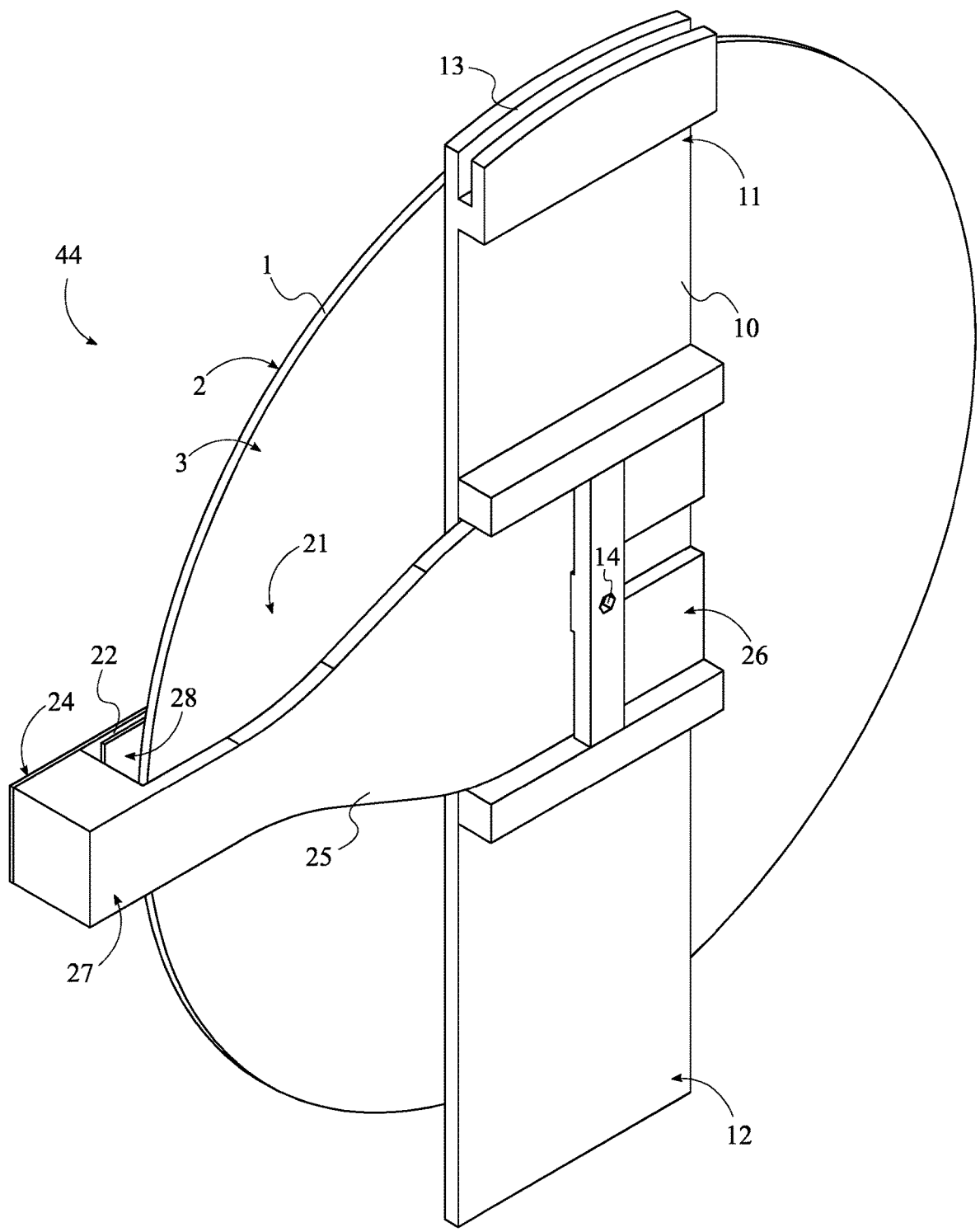
FIG. 16 is a top rear perspective view of the at least one focusing window assembly of the present invention, wherein the positioning panel and the support arm are shown mounted onto the plurality of turnable wheels and the elongated frame.
Figure 17:
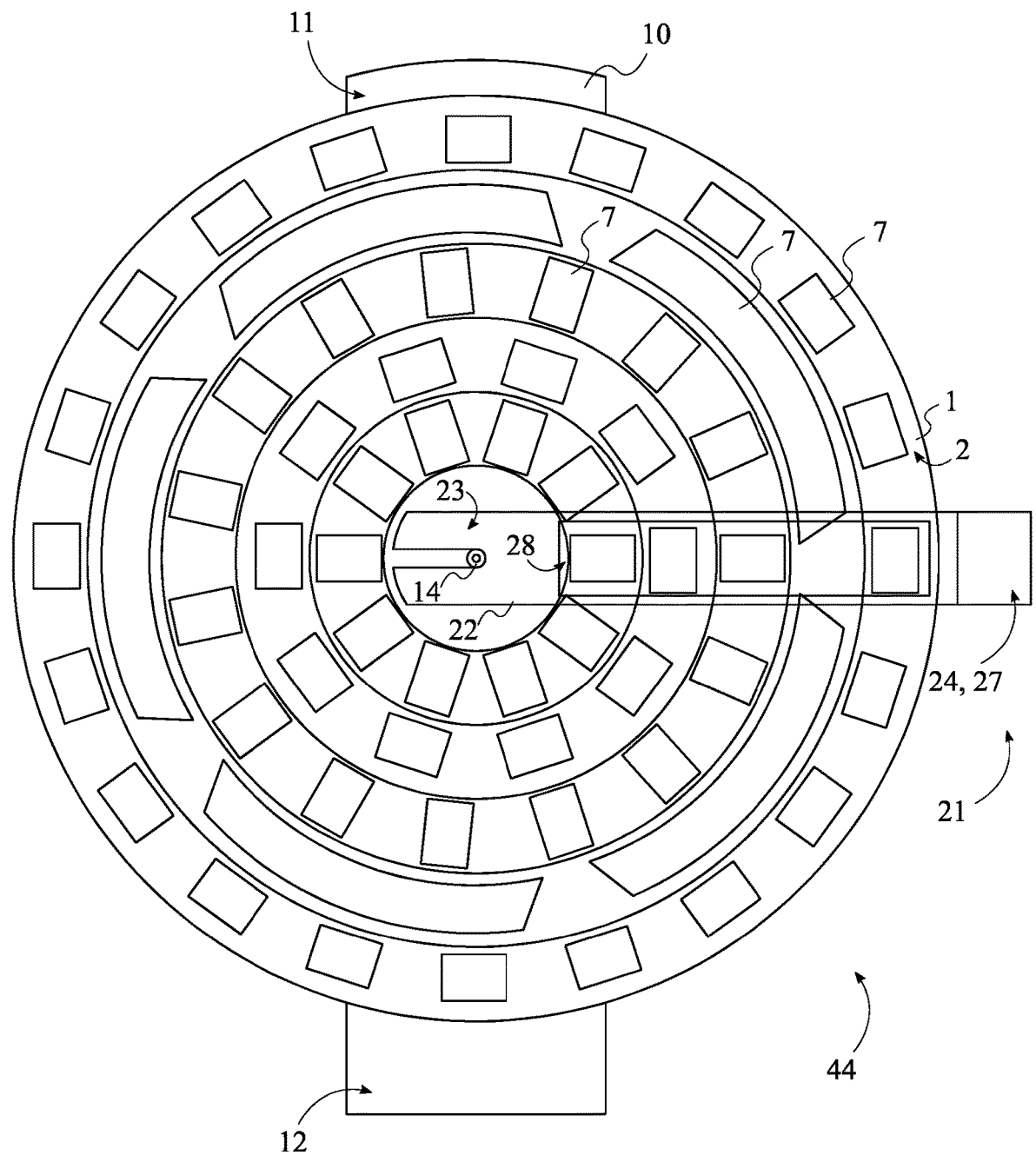
FIG. 17 is a front view of the at least one focusing window assembly of the present invention, wherein the positioning panel and the support arm are shown mounted onto the plurality of turnable wheels and the elongated frame.
Figure 18:
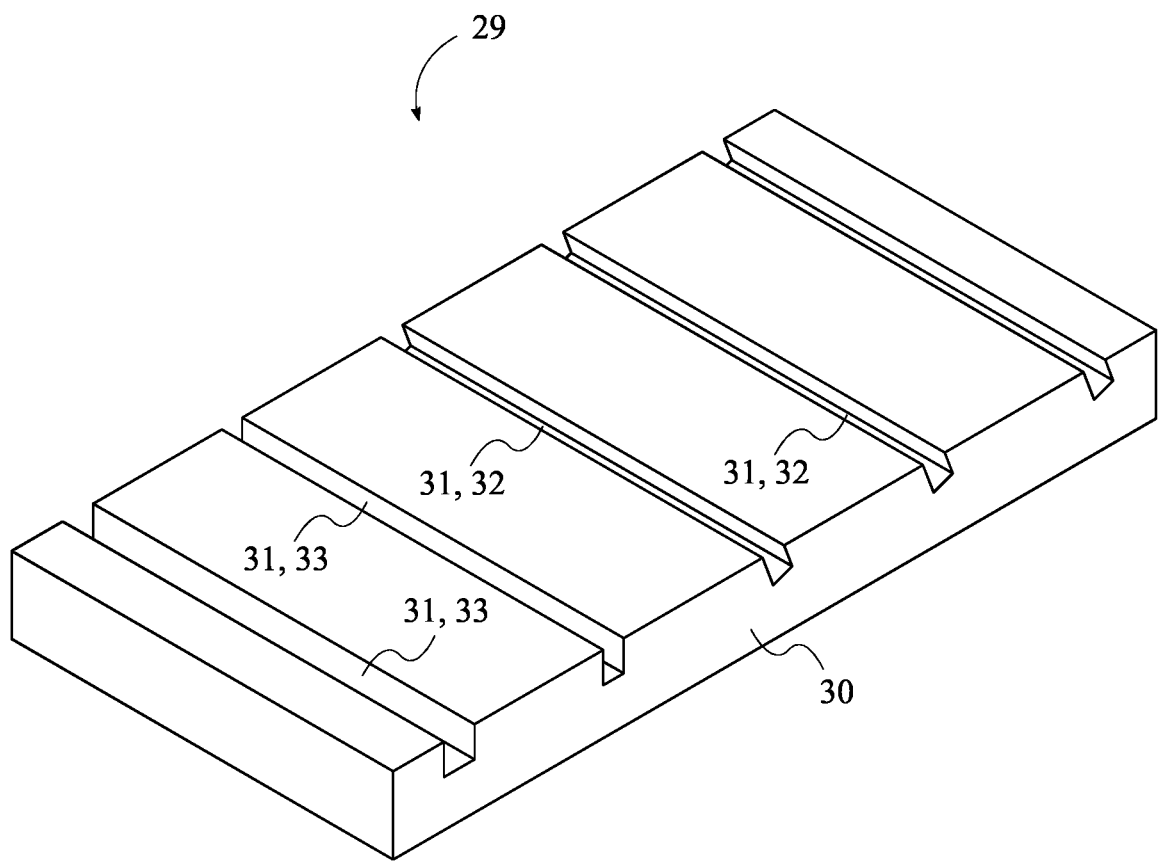
FIG. 18 is a top front perspective view of the base dock of the present invention.

To ensure the writable board face 17 is always positioned in a readily accessible manner to the user, the writable board face 17 is preferably positioned parallel to the writable wheel face 2. As can be seen in FIG. 12, the writable board face 17 and the writable wheel face 2 are oriented in a first direction 19. The first direction 19 preferably corresponds to the direction facing the user. Similarly, the hidden board face 18 is positioned parallel to the hidden wheel face 3. The hidden board face 18 and the hidden wheel face 3 are also oriented in a second direction 20. The second direction 20 preferably corresponds to the direction facing away from the user. So, the second direction 20 is oriented opposite to the first direction 19. In other embodiments, the at least one secondary board 15 can be oriented differently so that the writable board face 17 is kept hidden from the student so that only the educator can see the written content on the writable board face 17. The at least one secondary board 15 therefore can be used as a large flashcard on which a long sentence can be written (target language on one face, student's native language on the other face) or images drawn as cues instead of a translation into the student's native language.

Furthermore, to enable the quick attachment of the at least one secondary board 15 to the elongated frame 10, the elongated frame 10 may further comprise a board-receiving slot 13. As can be seen in FIGS. 4 through 6, 11, and 12, the board-receiving slot 13 is preferably a thin slot matching the thickness of the board body 16. The board-receiving slot 13 is integrated into the first frame end 11 to receive the board body 16. So, to secure the at least one secondary board 15 to the elongated frame 10, the board body 16 is attached into the board-receiving slot 13. This ensures that the board body 16 is secured to the elongated frame 10 in a removably manner. The internal surface of the board-receiving slot 13 are preferably lined with rubber/flexible magnetic patches that attract the board body 16, thereby further securing the at least one secondary board 15 to the elongated frame 10 and lower the possibility of the at least one secondary board 15 falling out of the board-receiving slot 13. The at least one secondary board 15 can be conveniently stowed at the back of the elongated frame 10. This is enabled by affixing at least one magnetic patch to an exposed area on the face of the elongated frame 10 opposite to the plurality of turnable wheels 1 that is wide enough to accommodate the width of the at least one secondary board 15. The at least one secondary board 15 can then be removably attached to the magnetic patch thanks to the magnetic features of the at least one secondary board 15.

To aid the educator with the teaching, the present invention may further comprise at least one focusing window assembly 21. As can be seen in FIG. 13 through 17, the at least one focusing window assembly 21 enables the educator to focus the students' attention on specific material written or displayed on the writable wheel face 2 of the plurality of turnable wheels 1. The at least one focusing window assembly 21 comprises a positioning panel 22, a support arm 25, and a tile-viewing window 28. The positioning panel 22 preferably corresponds to a thin elongated structure on which the tile-viewing window 28 can be cut out. So, the positioning panel 22 comprises a first panel end 23 and a second panel end 24 corresponding to the terminal ends of the positioning panel 22. The tile-viewing window 28 helps the students focus on specific content displayed on the writable wheel face 2. The support arm 25 is also an elongated structure that secures the positioning panel 22 in a horizontal orientation. Similar to the positioning panel 22, the support arm 25 comprises a first arm end 26 and a second arm end 27. To attach the at least one focusing window assembly 21 to the plurality of turnable wheels 1, the positioning panel 22 is positioned adjacent to the writable wheel face 2 for each of the plurality of turnable wheels 1. On the other hand, the support arm 25 is positioned adjacent to the hidden wheel face 3 for each of the plurality of plurality of turnable wheels 1. This positions the plurality of turnable wheels 1 in between the positioning panel 22 and the support arm 25. The first arm end 26 is laterally attached to the elongated frame 10, opposite to the plurality of turnable wheels 1, to secure the support arm 25 to the elongated frame 10. The second arm end 27 is attached onto the second panel end 24 to secure the positioning panel 22 to the support arm 25. Then, the first panel end 23 is laterally mounted to the elongated frame 10, adjacent to the plurality of wheels 1, to secure the positioning panel 22 to the elongated frame 10. This ensures that the positioning panel 22 does not come loose as the user turns the plurality of turnable wheels 1 during the lesson. The first arm end 26 and the first panel end 23 are also positioned concentric with the wheel rotation axis 39 so that the positioned panel 22 and the support arm 25 do not obstruct with the rotation of the plurality of turnable wheels 1. Further, the tile-viewing window 28 is integrated into the positioning panel 22 to only display specific written contents aligned horizontally across one or more writable wheel faces 2. The tile-viewing window 28 can be a cutout from the positioning panel 22, or a rectangular marking that graphically delineates the perimeter of the tile-viewing window 28 on the positioning panel 22. Further, the positioning panel 22 can be rotated upright. To hold the positioning panel 22 in place, a first magnetic piece can be attached to the second panel end 24, and a second magnetic piece can be attached to an exposed portion of the elongated frame 10 on top of the plurality of turnable wheels 1. This configuration of the positioning panel 22 is used when the educator wants to focus the students' attention on displayed contents arranged vertically on the plurality of turnable wheels 1 (such as a sentence read in a top-down fashion). Furthermore, the positioning panel 22 can point downwards in a similar fashion but the second magnetic piece is positioned below the plurality of turnable wheels 1.

Figure 3:
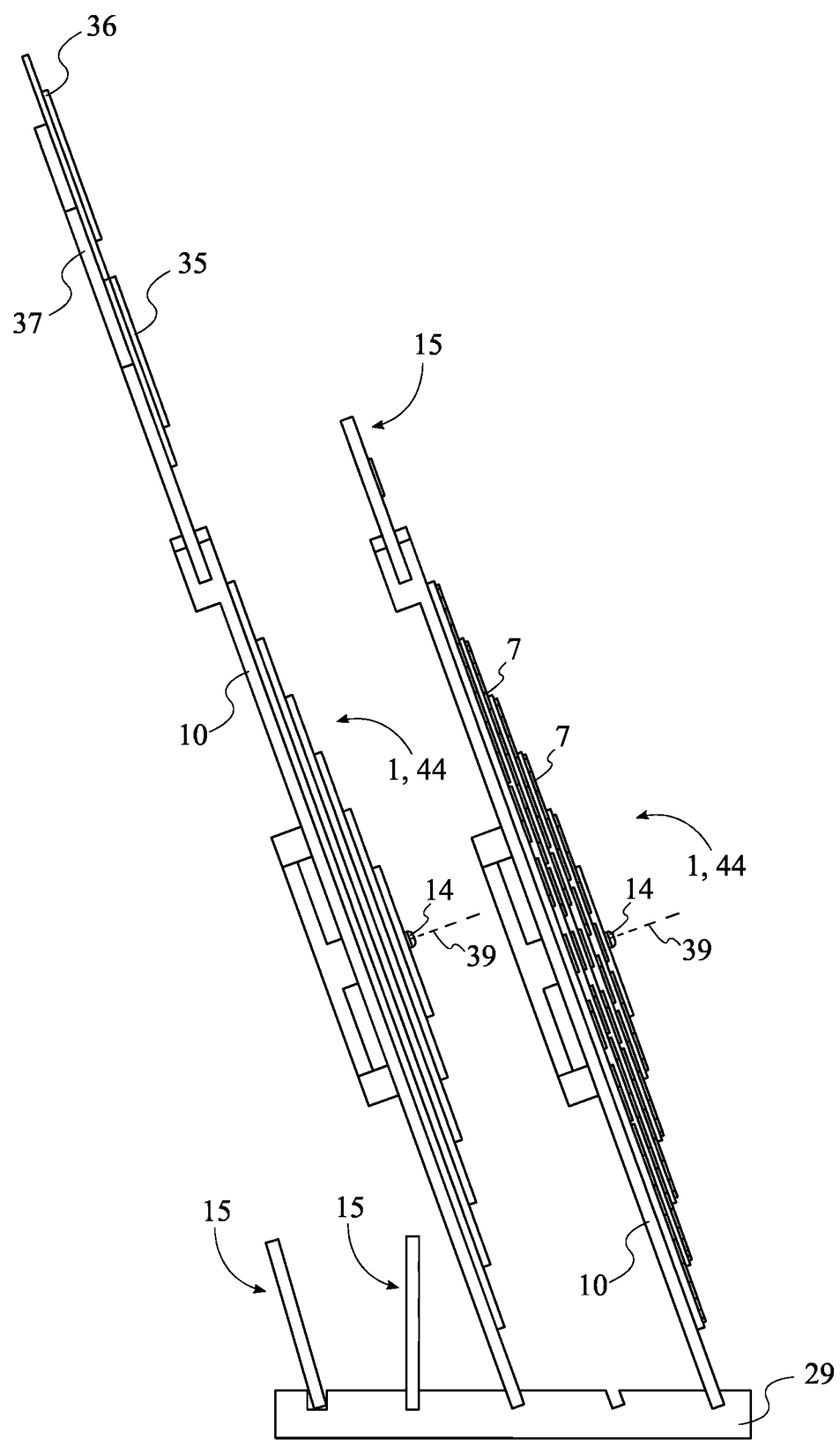
FIG. 3 is a side view of the present invention, wherein multiple units of the present invention are shown mounted onto the base dock.
Figure 4:
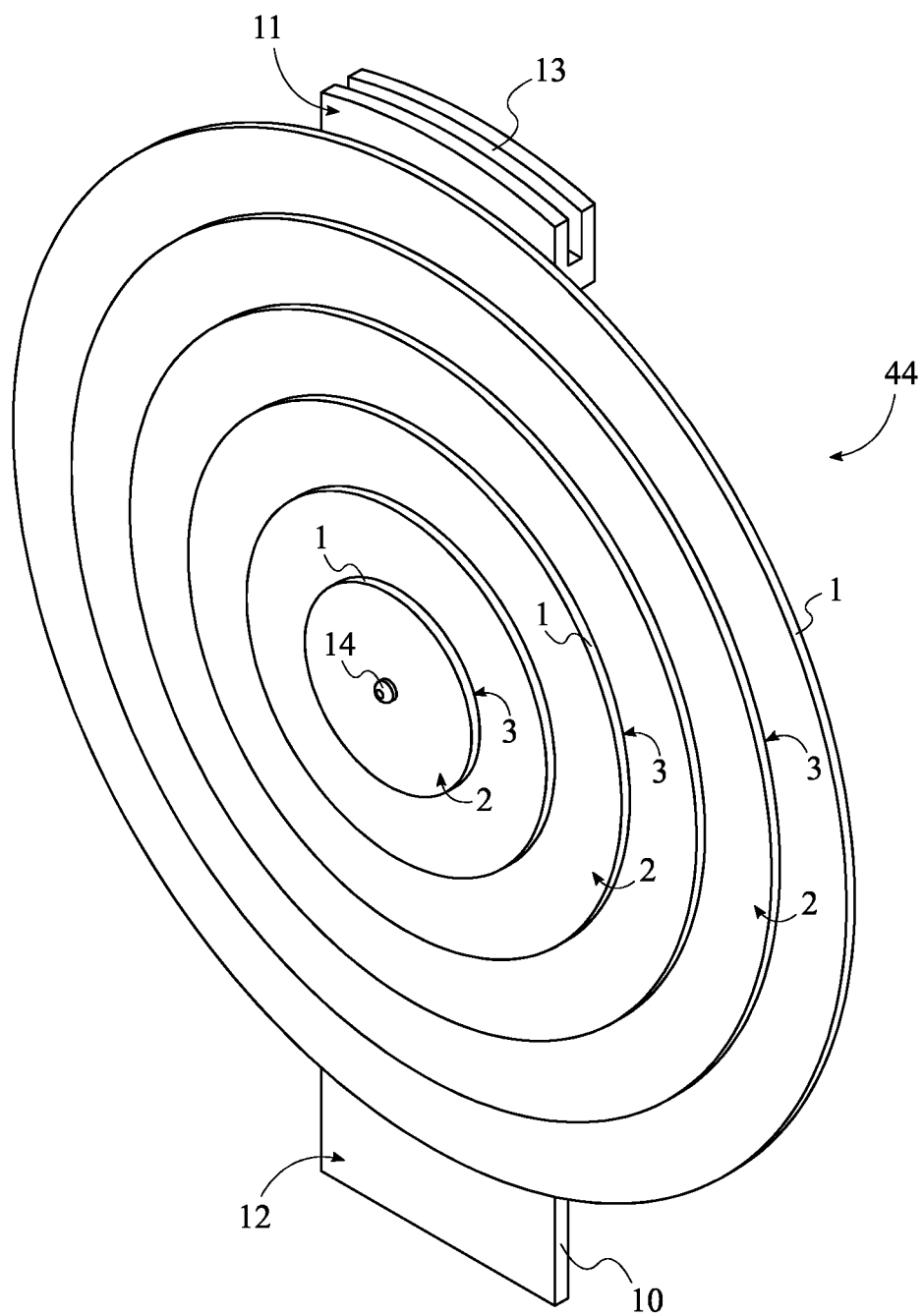
FIG. 4 is a top front perspective view of the plurality of turnable wheels and the elongated frame of the present invention.
Figure 5:
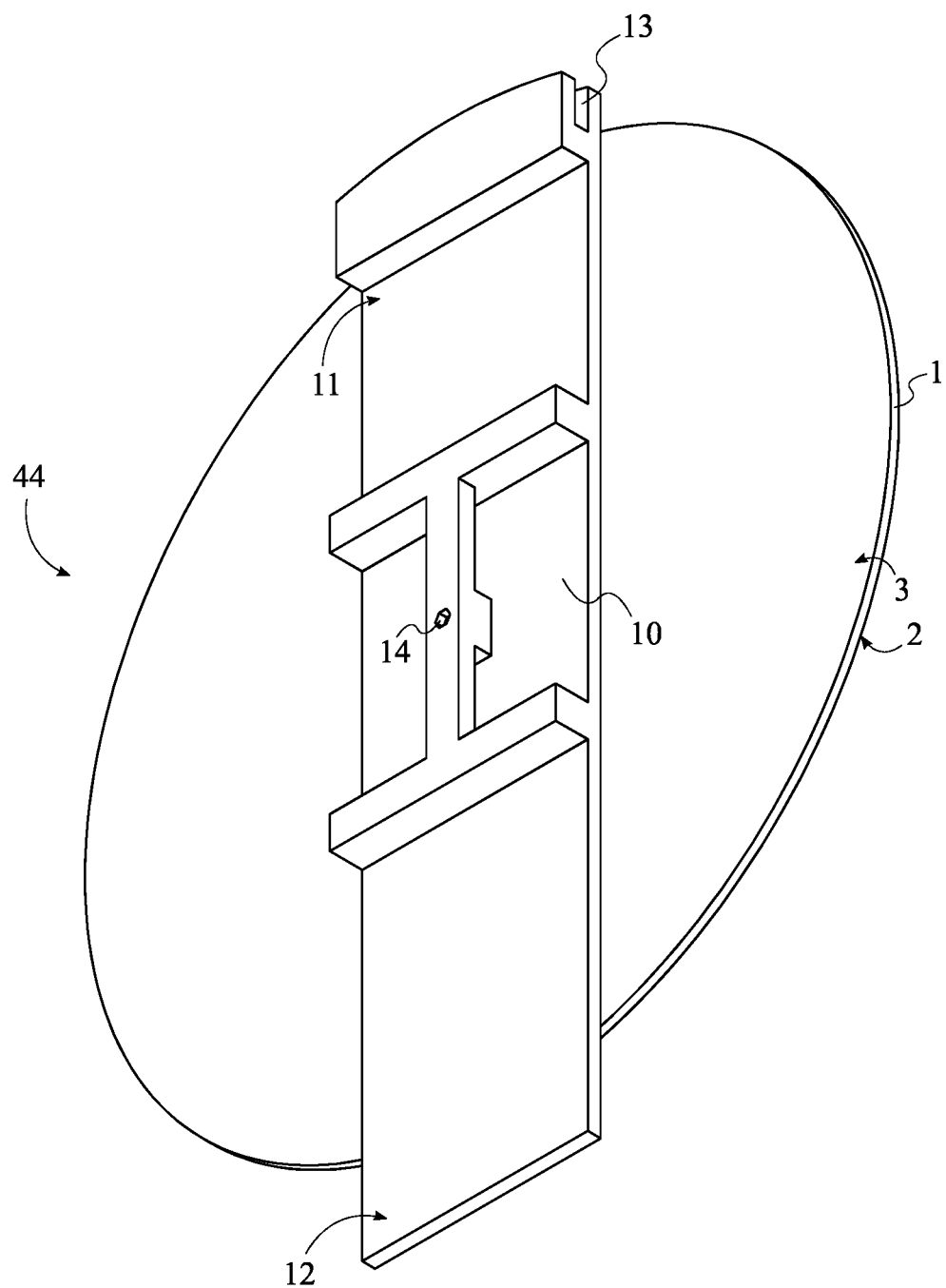
FIG. 5 is a bottom rear perspective view of the plurality of turnable wheels and the elongated frame of the present invention.
Figure 6:
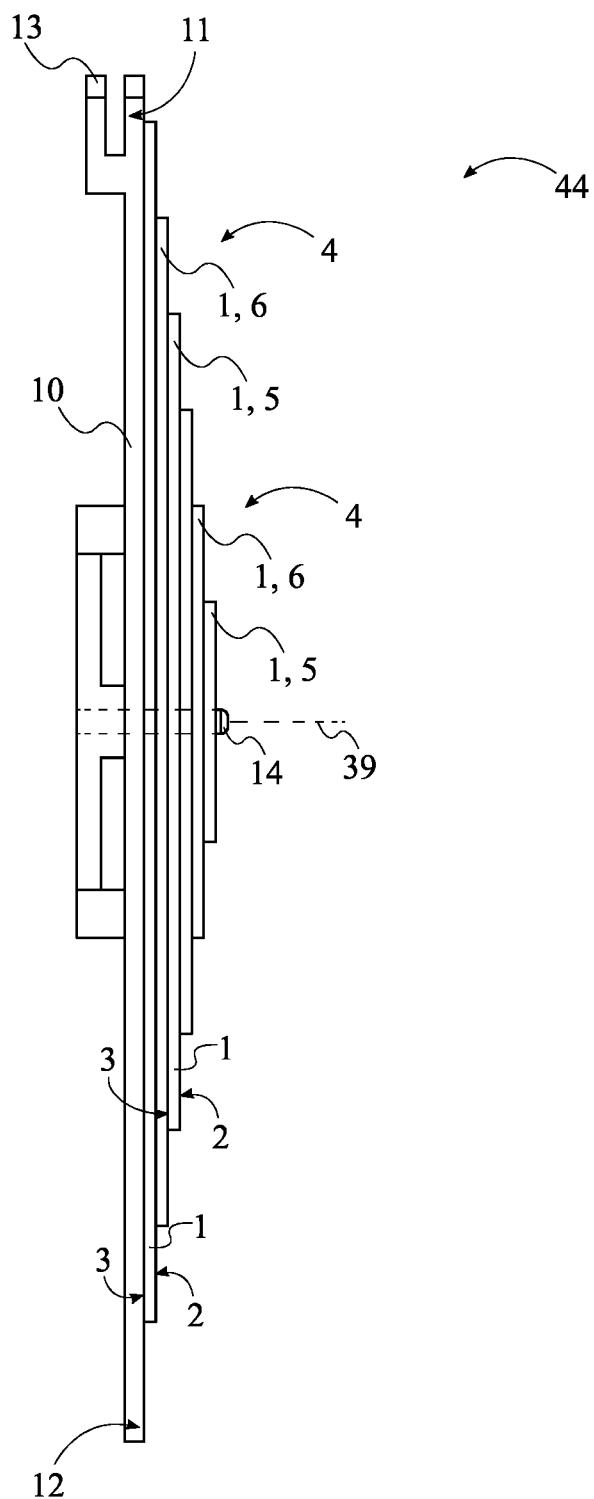
FIG. 6 is a side view of the plurality of turnable wheels and the elongated frame of the present invention.

To facilitate the assembly of the present invention, the present invention may further comprise a main axle 14 and each of the plurality of turnable wheels 1 is a disc-shaped wheel, as can be seen in FIGS. 3 and 6. The main axle 14 facilitates the individual rotation of each of the plurality of turnable wheels 1. The main axle 14 is positioned colinear along the wheel rotation axis 39 to ensure smooth rotation of the plurality of turnable wheels 1. The main axle 14 is also mounted perpendicular to the elongated frame 10 so that the rotation of plurality of turnable wheels 1 is not disrupted by the elongated frame 10. To ensure the smooth rotation of each of the plurality of turnable wheels 1, each of the plurality of turnable wheels 1 is concentrically positioned with the main axle 14. Each of the plurality of turnable wheels 1 is also rotatably mounted about the main axle 1.

As can be seen in FIG. 13 through 17, the positioning panel 22 can be easily detached from the main axle 14 and the second arm end 27 due to the design of the positioning panel 22. The first panel end 23 preferably has a cutout matching the diameter of the main axle 14 so that the first panel end 23 is easily engaged with the main axle 14. Moreover, the second panel end 24 preferably has a magnetic piece that engages with another magnetic piece on the second arm end 27 to ensure that the positioning panel 22 can be easily removed by the educator during a lesson. In some embodiments, the length of the tile-viewing window 28 extends from an inner wheel of the plurality of concentric wheels and an outer wheel of the plurality of concentric wheels. This enables the tile-viewing window 28 to cover the writable wheel face 2 of all the plurality of turnable wheels 1. The tile-viewing window 28 may also be shortened to cover specific turnable wheels. Furthermore, the positioning panel 22 may be made of a transparent material so that all other written material on the writable wheel face 2 is still visible while not being focused by the tile-viewing window 28.

To hold the present invention in an upright position without direct support from the user, the present invention may further comprise a base dock 29. As can be seen in FIGS. 1 through 3 and 18, the base dock 29 is designed to hold multiple units of the present invention in a readily accessible manner. The base dock 29 can also be used to retain the present invention in an upright manner during the lesson so that the educator is free to teach without having to hold onto the elongated frame 10. To do so, the base dock 29 comprises a dock body 30 and a plurality of docking slots 31. The dock body 30 is preferably an elongated rectangular structure large enough to hold multiple units of the present invention. The plurality of docking slots 31 provides multiple locations on which the multiple units can be attached into. To receive the multiple units of the present invention, each of the plurality of docking slots 31 traverses into the dock body 30. The plurality of docking slots 31 is also positioned offset from each other so that the multiple units of the present invention do not interfere with the docking of the other units. In some embodiments, the underside of the base dock 29 may be coated with anti-slip material to prevent the base dock 29 from slipping during use. Further, to secure the elongated frame 10 of a unit to the base dock 29, the second frame end 12 is attached into a selected slot from the plurality of docking slots 31. The base dock 29 can also retain multiple units of the at least one secondary board 15. To attach the at least one secondary board 15 to the dock body 30, the board body 16 is attached into another selected slot from the plurality of docking slots 31. Thus, the user can have multiple secondary boards available during the lesson to use.

To retain the multiple units of the present invention in different orientations, the plurality of docking slots 31 comprises a plurality of angled-bottomed slots 32 and a plurality of flat-bottomed slots 33. As can be seen in FIGS. 1 through 3 and 18, the plurality of angled-bottomed slots 32 is designed to retain the elongated frame 10 or board body 16 at an angle for easier viewing of the written content on the writable wheel face 2 of the plurality of turnable wheels 1. The plurality of flat-bottomed slots 33 is designed to retain the elongated frame 10 or board body 16 in an upright position. To separate the plurality of angled-bottomed slots 32 from the plurality of flat-bottomed slots 33, the plurality of angle-bottomed slots 32 is positioned adjacent to the plurality of flat-bottomed slots 33 along the dock body 30. The plurality of docking slots 31 can be made in varying widths to accommodate different thicknesses of the elongated frame 10. The plurality of docking slots 31 can also allow mobile computing devices such as handphones and tablet computers, which have different thicknesses, to be docked into the base dock 29 such that the students can watch the lesson content delivered in a video format, while using the educator's hands to attach the plurality of display tiles 7 onto the writable wheel face 2, and spin the plurality of turnable wheels 1 to rearrange the display tiles, revealing new meaning-making possibilities.

In some embodiments, the present invention may further comprise a tile-retaining receptacle to hold the plurality of display tiles 7 in a readily accessible manner. The present invention may further comprise a support insert that enables the tile-retaining receptacle to be attached onto the base dock 29. To secure the tile-retaining receptacle to the base dock 29, the support insert is attached into another selected slot from the plurality of docking slots 31. In addition, the tile-retaining receptacle is connected adjacent to the support insert, offset from the base dock 29. This enables multiple display tiles from the plurality of display tiles 7 to be temporarily held on the tile-retaining receptacle. So, the user can remove a desired display tile from the tile-retaining receptacle and then attach the display tile onto the desired position on the writable wheel face 2.

In other embodiments, the present invention may further comprise a frame mount that supports the elongated frame 10 in an upright position without the need of the base dock 29. The frame mount can be used during the lesson to position the present invention at the desired location and/or orientation. The frame mount preferably has a shape and size that matches the overall size of the present invention. For example, the frame mount can be a small mount that supports a smaller version of the present invention that is used by a student on a desk. The frame mount can also be a large floor-standing mount that supports a large version of the present invention that is used by the educator to teach the whole classroom. Said floor-standing mount can be designed to have different shapes, such as a A-shape or inverted T-shape. So, to secure the present invention to the frame mount, the frame mount is terminally mounted onto the second frame end 12. In other embodiments, the elongated frame 10 may be attached to other supporting devices, such as a tripod. In yet further embodiments, the elongated frame 10 may be attached to any sturdy object or surfaces (such as wall or classroom whiteboard) by means of one or more hooks or removable fastening devices (such as stretchable bands).

Figure 2:
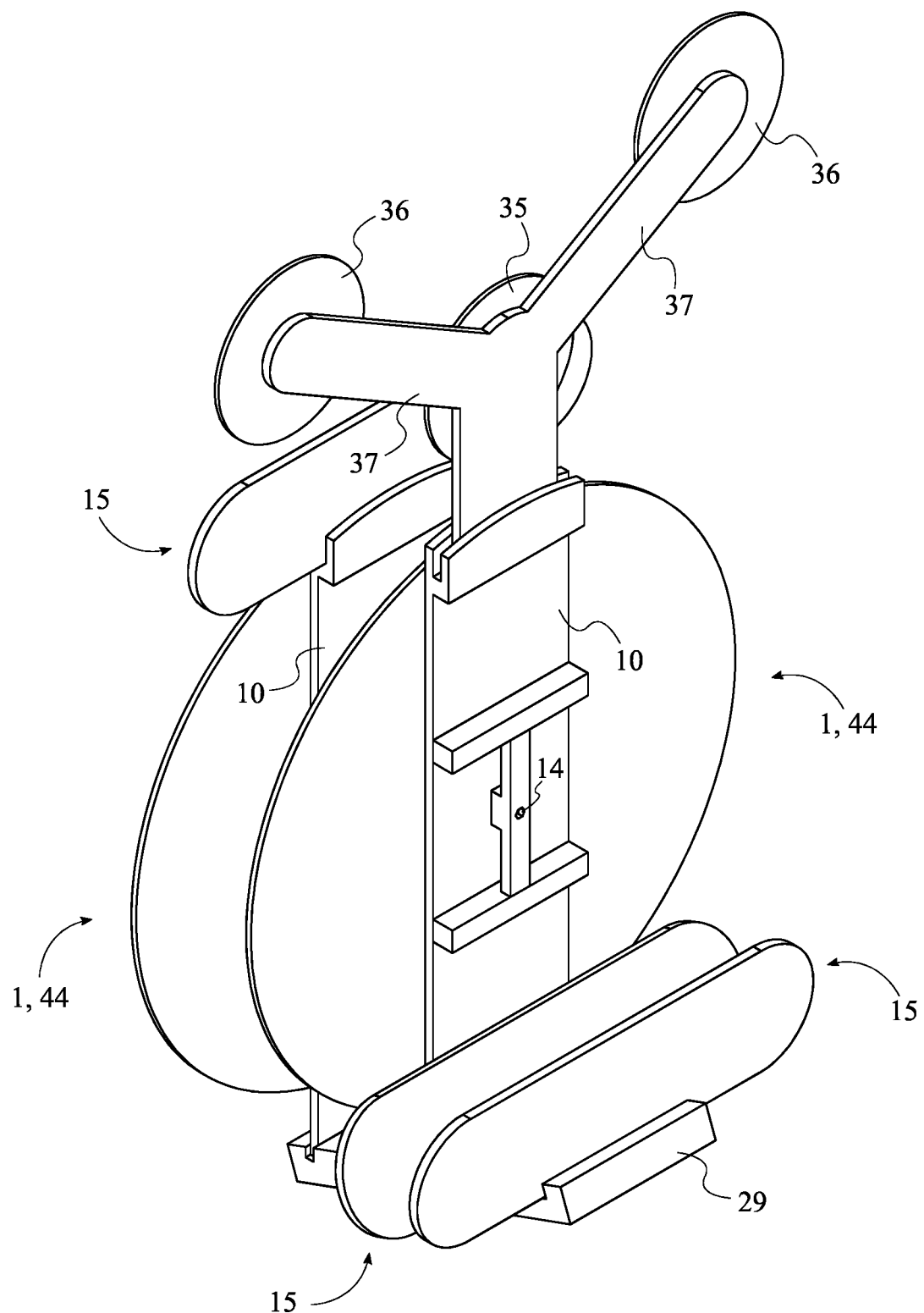
FIG. 2 is a top rear perspective view of the present invention, wherein multiple units of the present invention are shown mounted onto the base dock.

In some embodiments, the present invention may further comprise a first stacked secondary wheel set 35. As can be seen in FIG. 1 through 3, the first stacked secondary wheel set 35 is a smaller version of the plurality of turnable wheels 1 that provides additional writable surfaces for the user without having to use another unit of the present invention. Like the plurality of turnable wheels 1, the first stacked secondary wheel set 35 comprises multiple wheels that can be rotated independently from each other. Each wheel from the first stacked secondary wheel set 35 also comprises a writable face which the user can write on. The first stacked secondary wheel set 35 is rotatably mounted to the first frame end 11 to position the first stacked secondary wheel set 35 on top of the plurality of turnable wheels 1. In addition to the first stacked secondary wheel set 35, the present invention may further comprise at least one second stacked secondary wheel set 36 to provide additional writable surfaces. The present invention may further comprise at least one extension arm 37 to support the at least one second stacked secondary wheel set 36. The at least one second stacked secondary wheel set 36 is radially positioned about the first stacked secondary wheel set 35 to keep all stacked wheel sets close to each other. In addition, the at least one extension arm 37 is connected adjacent to the elongated frame 10 to secure the at least one extension arm 37 to the elongated frame 10. Further, the at least one second stacked secondary wheel set 36 is rotatably connected to the at least one extension arm 37, offset from the first stacked secondary wheel set 35. This enables the user to easily reach all the nested wheel sets surrounding the plurality of turnable wheels 1. In some embodiments, the at least one second stacked secondary wheel set 36 may be several second nested wheel sets.

Figure 19:
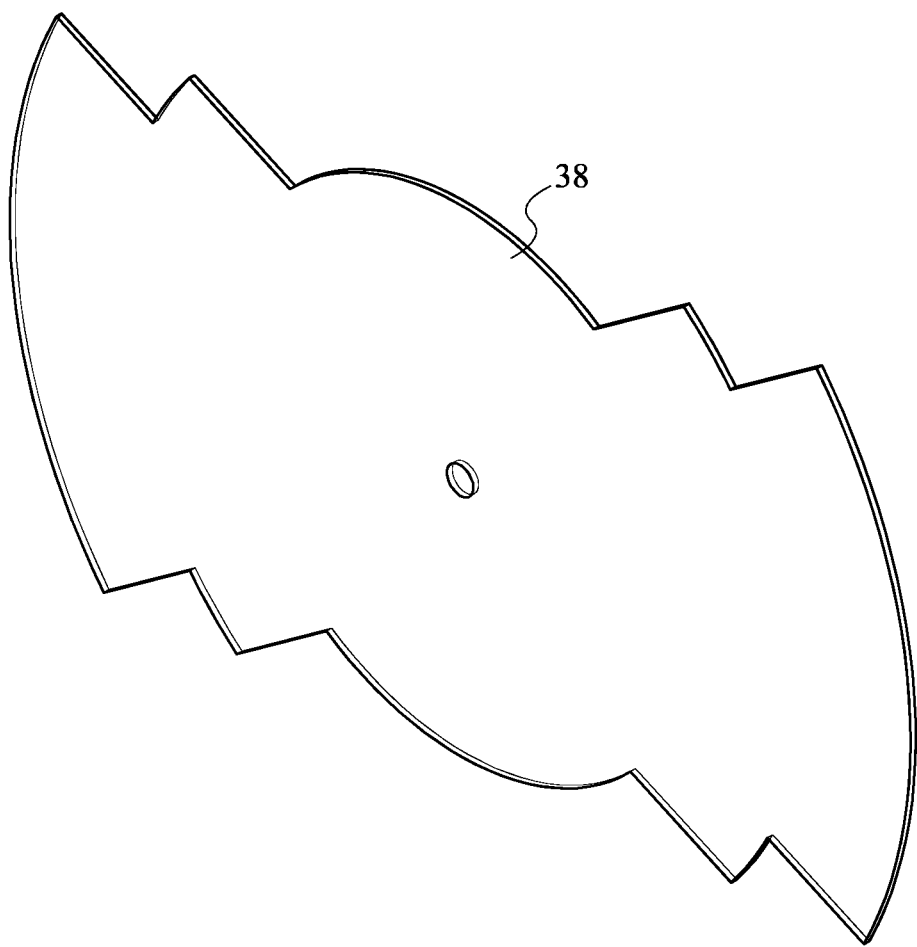
FIG. 19 is a top front perspective view of the annotatable transparent wheel of the present invention.
Figure 20:
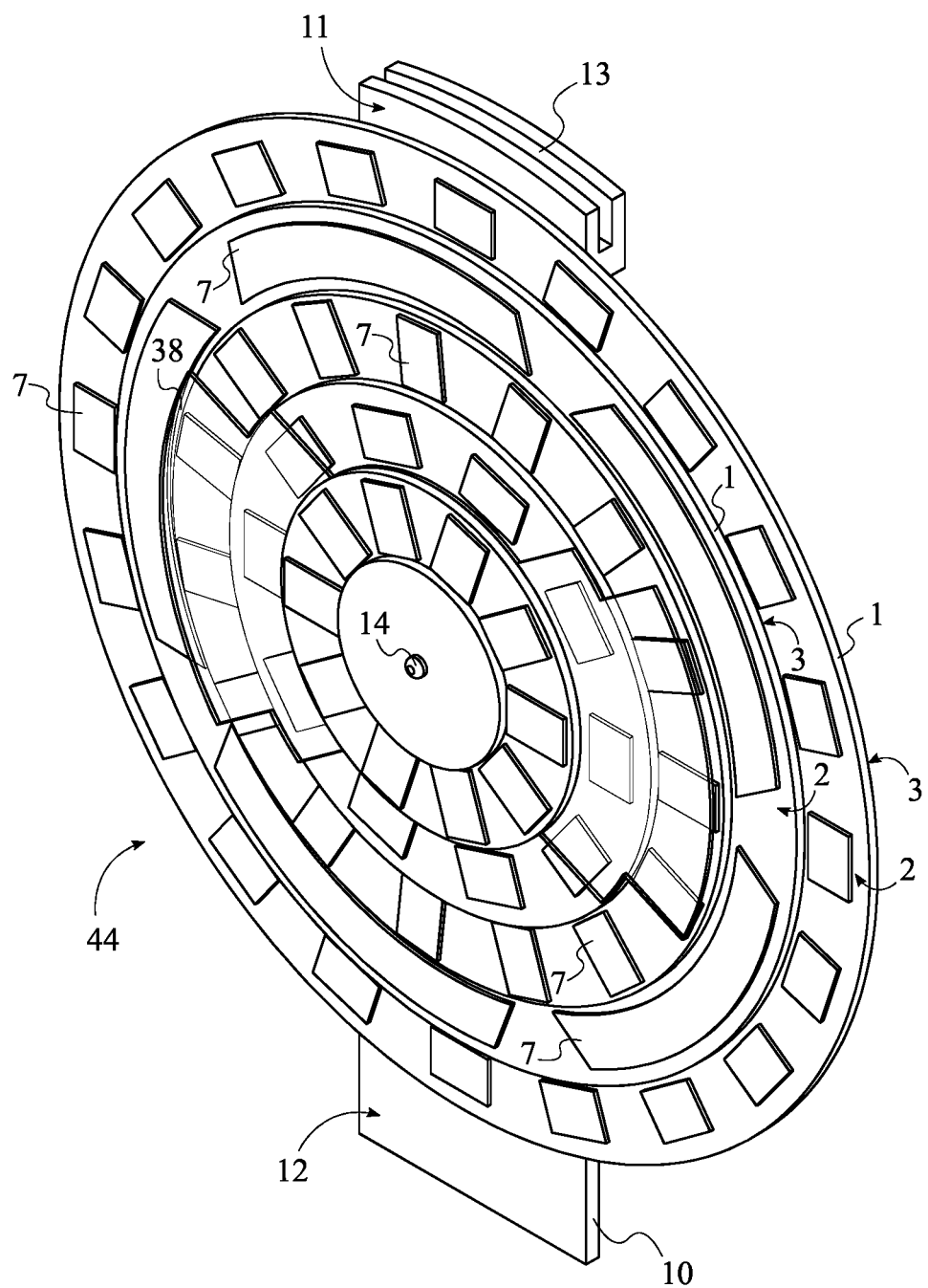
FIG. 20 is a top front perspective view of the annotatable transparent wheel of the present invention, wherein the annotatable transparent wheel is shown mounted onto the main axle opposite to the elongated frame.
Figure 21:
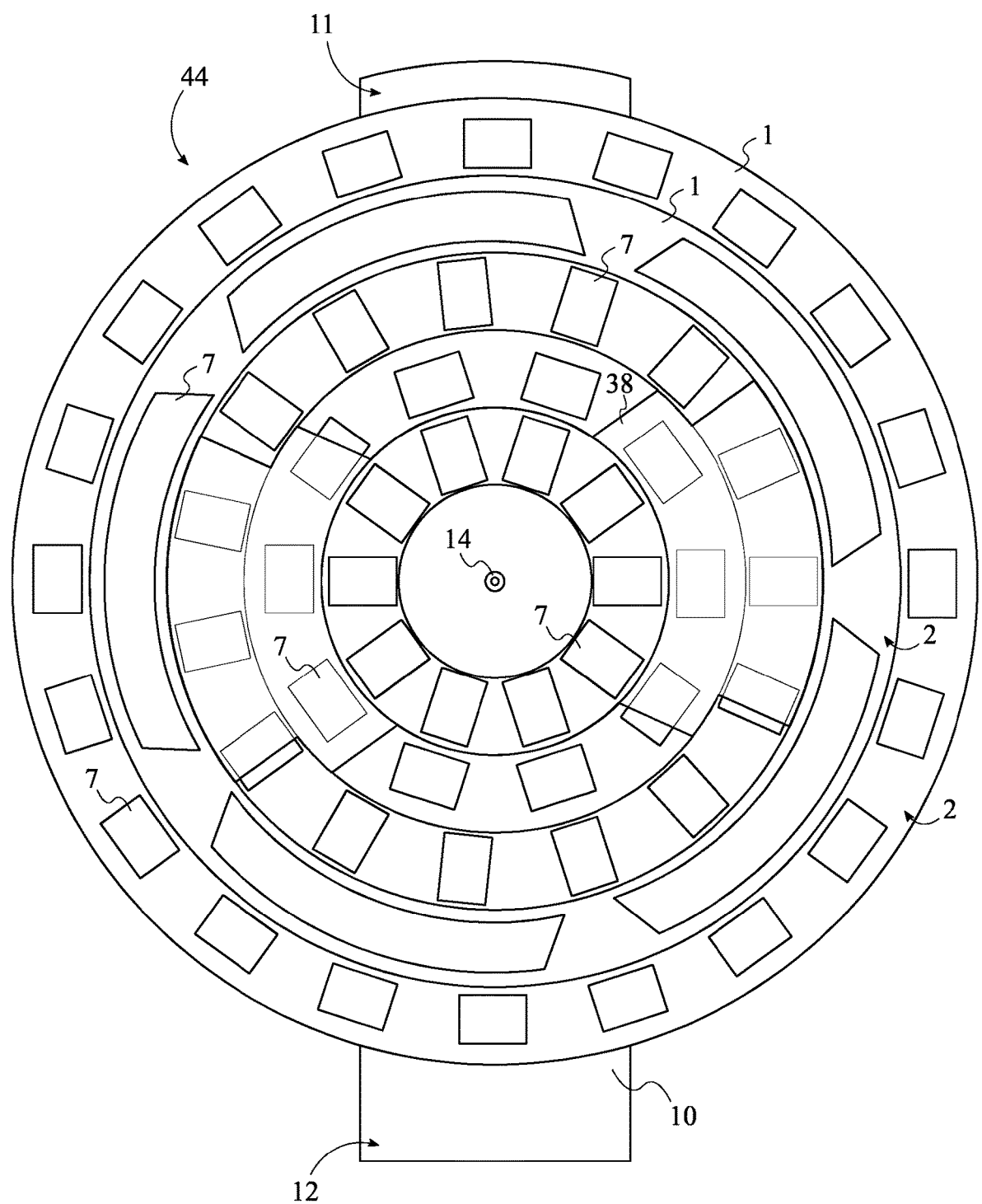
FIG. 21 is a front view of the annotatable transparent wheel of the present invention, wherein the annotatable transparent wheel is shown mounted onto the main axle opposite to the elongated frame.
Figure 22:
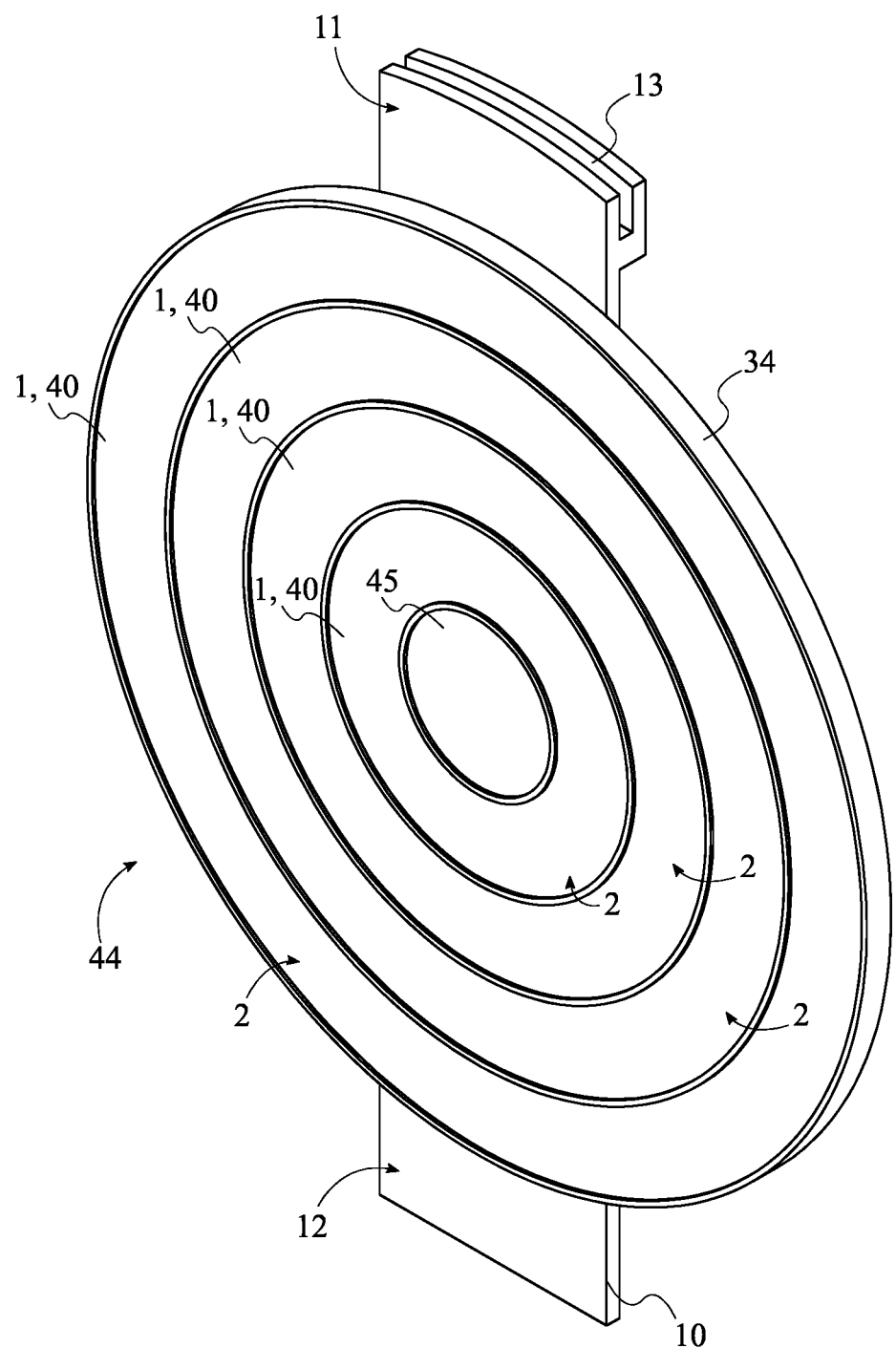
FIG. 22 is a top front perspective view of the plurality of turnable wheels and the elongated frame of the present invention, wherein the plurality of turnable wheels is shown within a wheel casing in a nested configuration.
Figure 23:
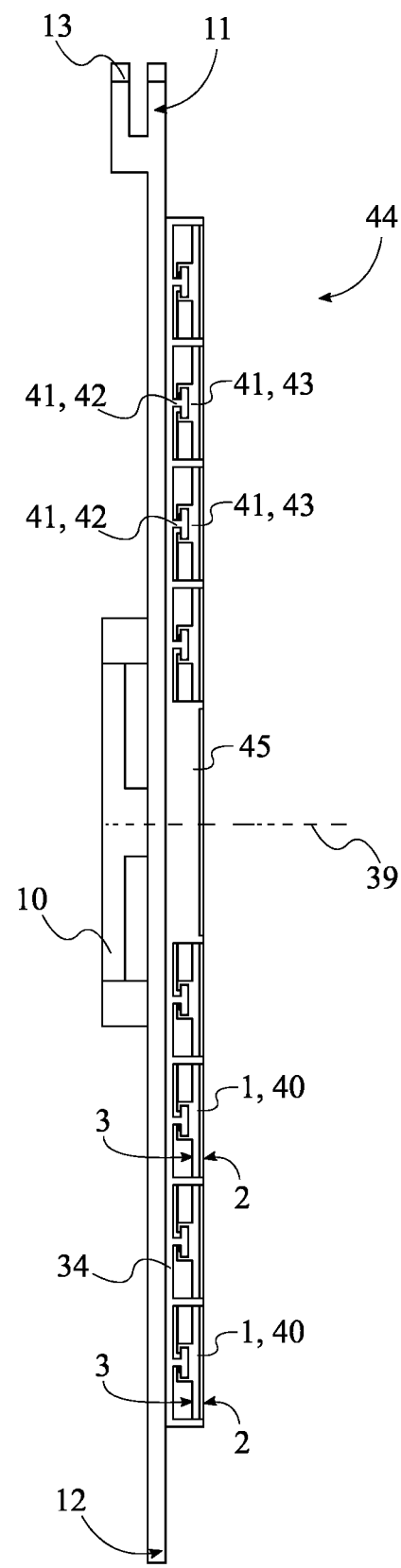
FIG. 23 is a schematic side view showing a first embodiment of the nested configuration of the plurality of turnable wheels in the wheel casing.
Figure 24:
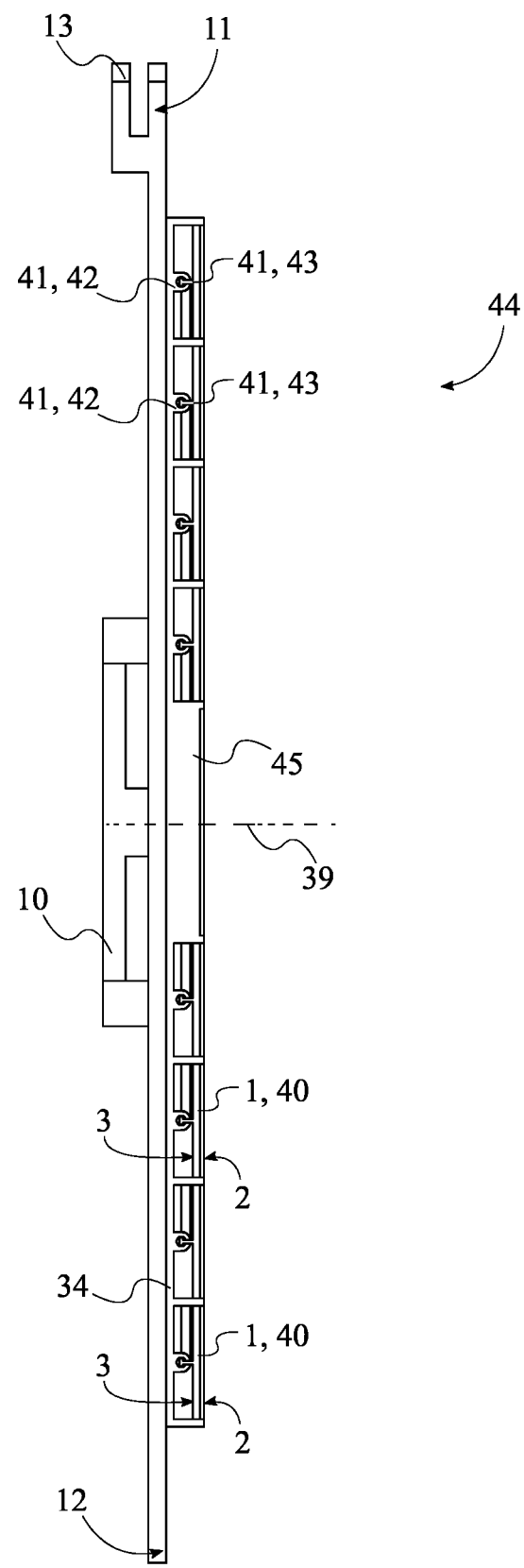
FIG. 24 is a schematic side view showing a second embodiment of the nested configuration of the plurality of turnable wheels in the wheel casing.

To help the educator to teach languages that utilize accent marks, the present invention may further comprise an annotatable transparent wheel 38. As can be seen in FIG. 19 through 21, the annotatable transparent wheel 38 enables the user to add markings, permanently or temporarily, on either face of the annotatable transparent wheel 38. The annotatable transparent wheel 38 hovers above the written content on the writable surfaces of the present invention without altering the written content. To do so, the annotatable transparent wheel 38 is coextensive with an outer wheel from the plurality of turnable wheels 1. This enables the annotatable transparent wheel 38 to cover a portion of the writable wheel face 2 of one or more turnable wheels from the plurality of turnable wheels 1. The annotatable transparent wheel 38 is also positioned adjacent a specific turnable wheel from the plurality of turnable wheels 1, opposite to the elongated frame 10, to ensure any marking made on the annotatable transparent wheel 38 is positioned on top of the desired written content. Moreover, the annotatable transparent wheel 38 is concentrically positioned with the wheel rotation axis 39, and thus the main axle 14. The annotatable transparent wheel 38 is also rotatably mounted to the elongated frame 10 by the main axle 14 to ensure that the annotatable transparent wheel 38 can be rotated like the plurality of turnable wheels 1.

In some embodiments, the plurality of turnable wheels 1 may be designed in a nested configuration, as can be seen in FIG. 22 through 31. To enable a nested configuration, the present invention may further comprise a wheel casing 34 that receives the plurality of turnable wheels 1. In addition, each of the plurality of turnable wheels 1 may be an annulus-shaped wheel 40. The wheel casing 34 enables the annulus-shaped wheels 40 to be arranged in nested manner without obstructing the rotation of each of the annulus-shaped wheels 40. So, the writable wheel face 2 for each of the plurality of turnable wheels 1 are positioned coplanar to each other. Similarly, the hidden wheel face 3 for each of the plurality of turnable wheels 1 are positioned coplanar to each other. In addition, the wheel casing 34 is positioned concentric to the wheel rotation axis 39. The wheel casing 34 is also positioned in between the plurality of turnable wheels 1 and the elongated frame 10. Each of the plurality of turnable wheels 1 is slidably connected about the wheel casing 34 so that the annulus-shaped wheels 40 can be rotated within the wheel casing 34. Further, the wheel backing 34 is laterally mounted to the elongated frame 10 to complete the assembly.

In the nested configuration, each of the plurality of turnable wheels 1 is rotatably mounted within the wheel casing 34. As can be seen in FIG. 22 through 31, each of the plurality of turnable wheels 1 may be rotatably connected to the wheel backing 34 by a plurality of paired annular tracks 41 of the at least one demonstration mechanism 44. The plurality of paired annular tracks 41 reduce any friction between the plurality of turnable wheels 1 and the wheel casing 34 so that the plurality of turnable wheels 1 can freely rotate within the wheel casing 34. Each of the plurality of paired annular tracks 41 may comprise an annulus-shaped body 42 and a plurality of track guides 43. The plurality of track guides 43 is radially connected around the annulus-shaped body 42 to guide the movement of the annulus-shaped body 42. Each of the plurality of paired annular tracks 43 is also positioned concentric with the wheel rotation axis 39 so that the overall assembly is disc-like. Further, the plurality of paired annular tracks 43 is connected into the wheel casing 34, opposite to the elongated frame 10. Then, to complete the assembly, the plurality of track guides 43 for each of the plurality of turnable wheels 1 is slidably connected to a corresponding paired annular track from the plurality of paired annular tracks 41. In some embodiments, the plurality of paired annular tracks 41 is a plurality of single annular tracks. The plurality of track guides 43 may also be provided in segments to accommodate a lighter design. To do so, hatch openings may be cut into the bottom base of the wheel casing 34 to provide access for such attachments when the present invention is assembled.

The nested configuration of the present invention can be made with a solid or hollow center. As can be seen in FIG. 22 through 31, thanks to the wheel casing 34, the nested configuration can be used independently of the elongated frame 10. The nested configuration with a solid center may be attached to the elongated frame 10 by a fastener such as a hand knob that tightly secures the wheel casing 34 to the elongated frame 10 so that the wheel casing 34 does not rotate. For the nested configuration with a hollow center, a mounting hub 45 may be provided to fill that hollow space. The wheel casing 34 is centrally attached into an inner wheel from the plurality of turnable wheels 1 to secure the wheel casing 34 to the elongated frame 10 in a static configuration. In other words, the wheel casing 34 does not rotate on the elongated frame 10. The mounting hub 45 may include a fastening device that secures the mounting hub 45 onto the elongated frame 10 to keep the assembly modular.

Figure 25:
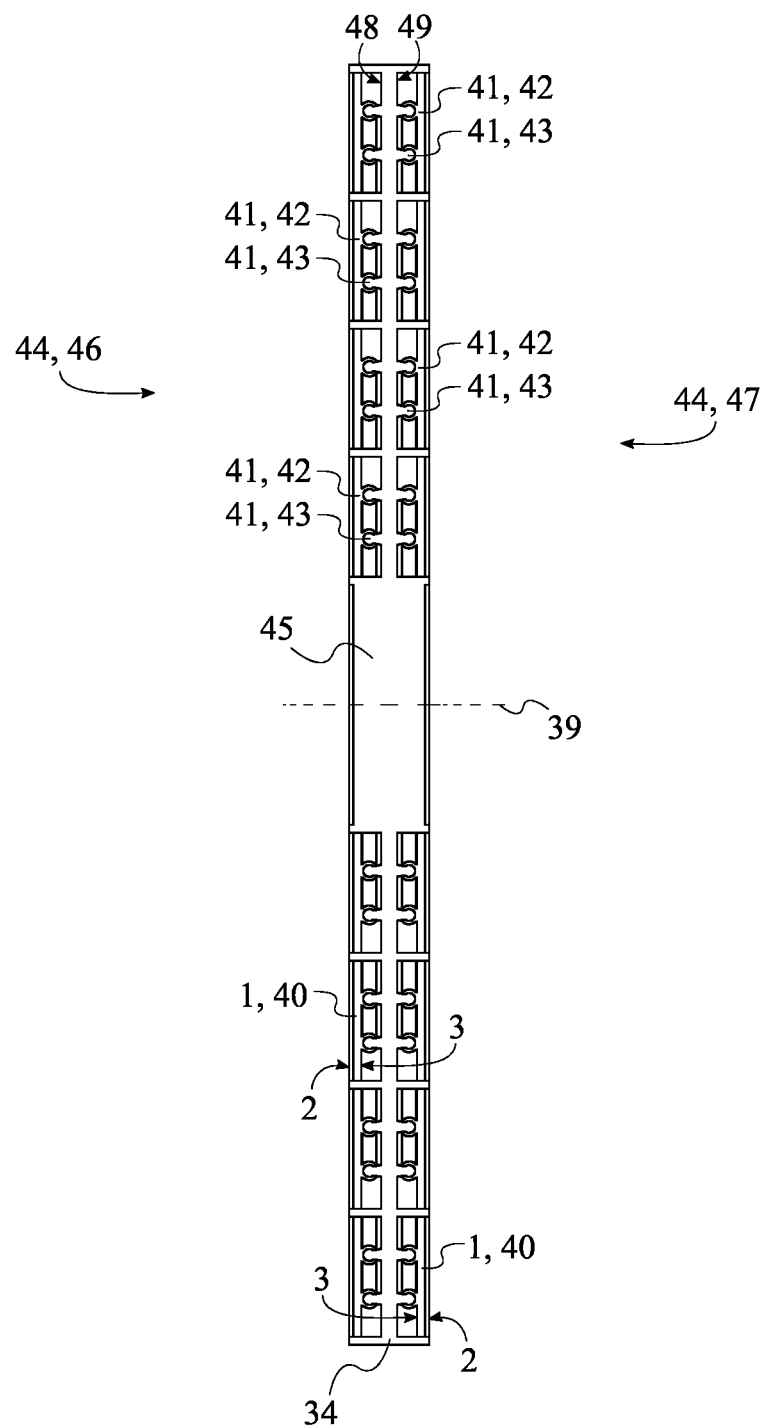
FIG. 25 is a schematic side view showing a third embodiment of the nested configuration of the plurality of turnable wheels in the wheel casing.
Figure 26:
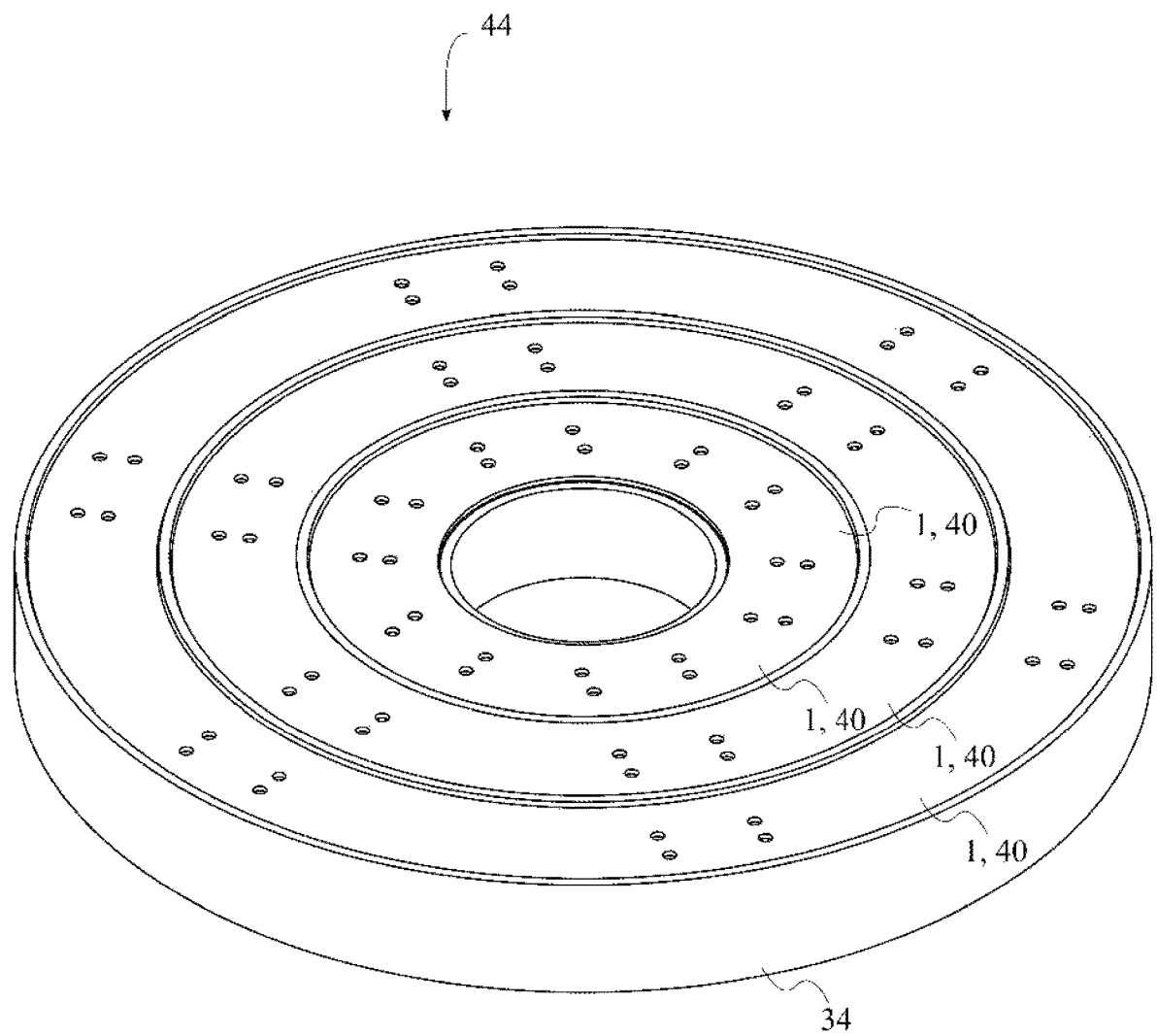
FIG. 26 is a top front perspective view of the plurality of turnable wheels and the wheel casing of the present invention, wherein the plurality of turnable wheels is shown perforated, and wherein the wheel casing is shown with a hollow center.
Figure 27:
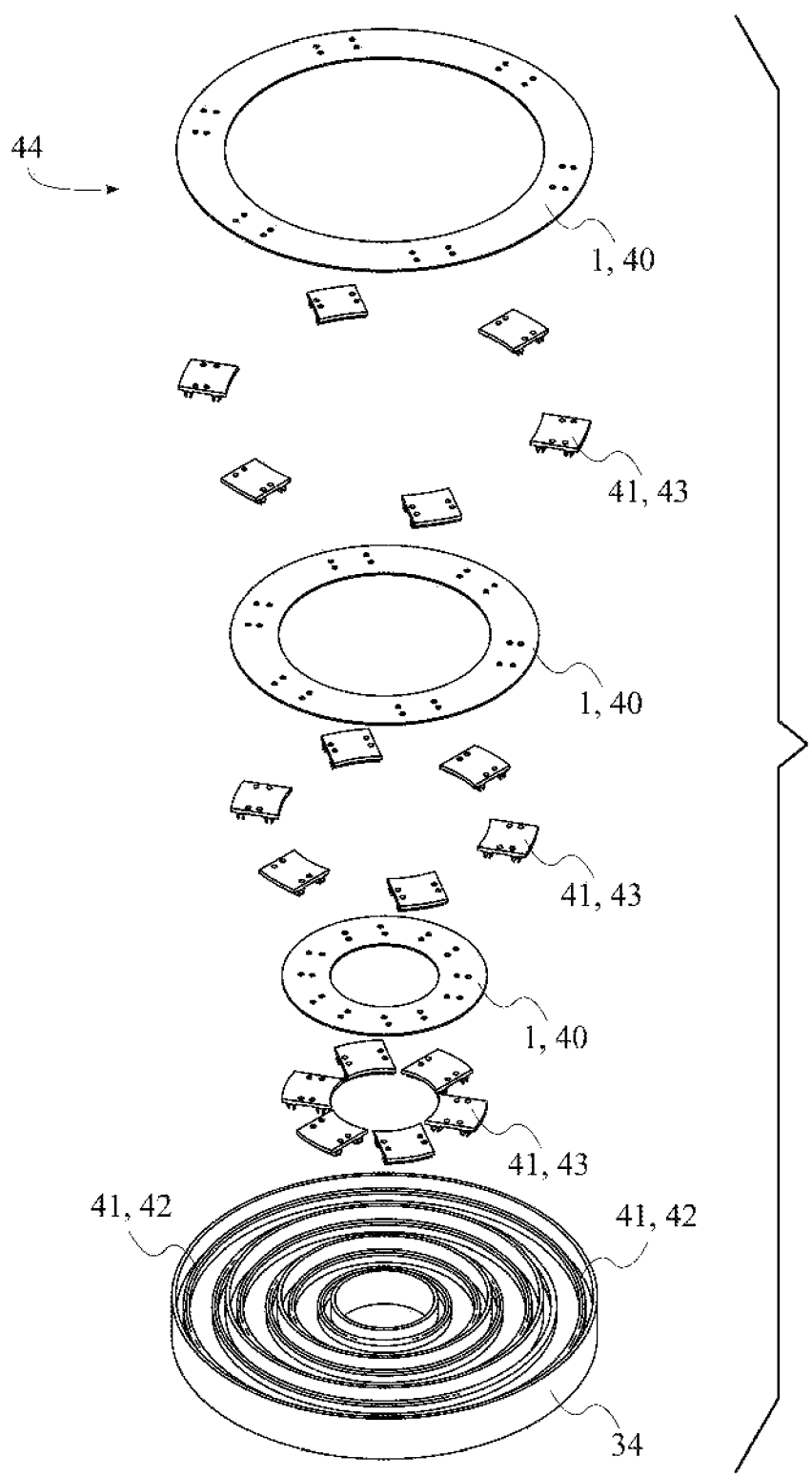
FIG. 27 is a top front exploded perspective view of the plurality of turnable wheels and the wheel casing of the present invention, wherein the plurality of turnable wheels is shown perforated, wherein the wheel casing is shown with a hollow center.
Figure 28:
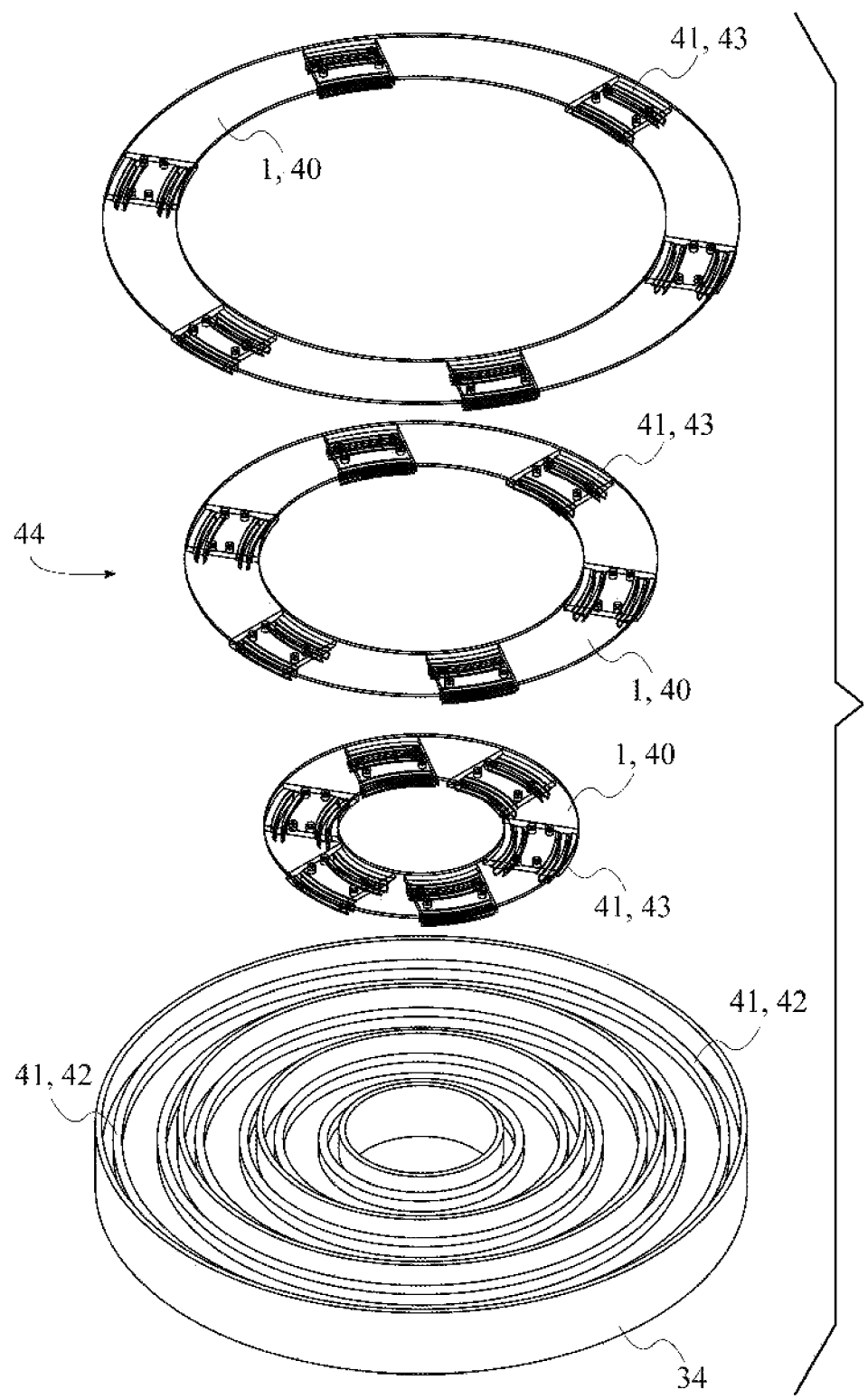
FIG. 28 is a top front exploded perspective view of the plurality of turnable wheels and the wheel casing of the present invention, wherein a plurality of track guides is shown in a segmented configuration.
Figure 29:
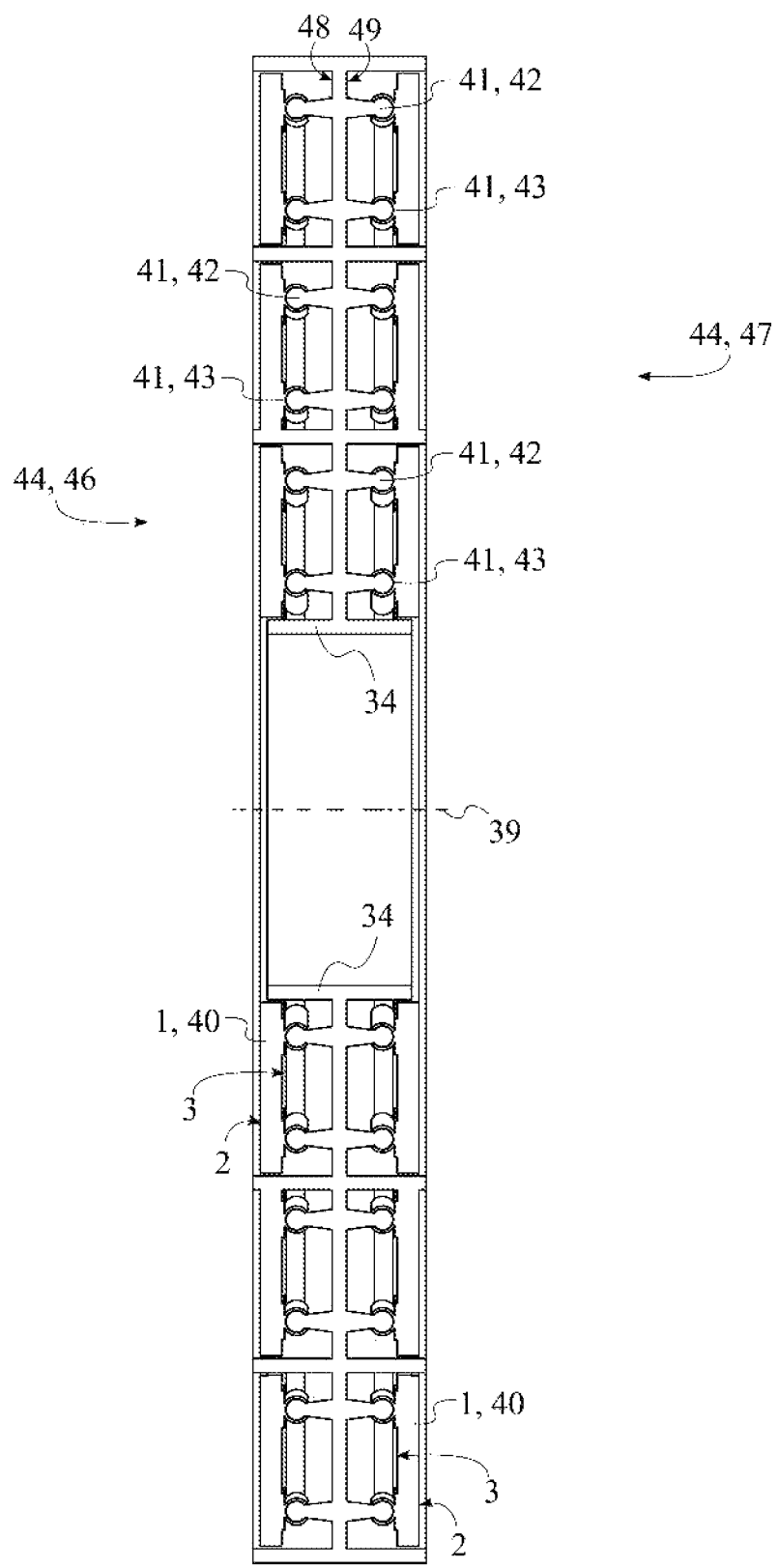
FIG. 29 is a schematic side view showing a fourth embodiment of the nested configuration of the plurality of turnable wheels in the wheel casing, wherein the plurality of track guides is shown in the segmented configuration.
Figure 30:
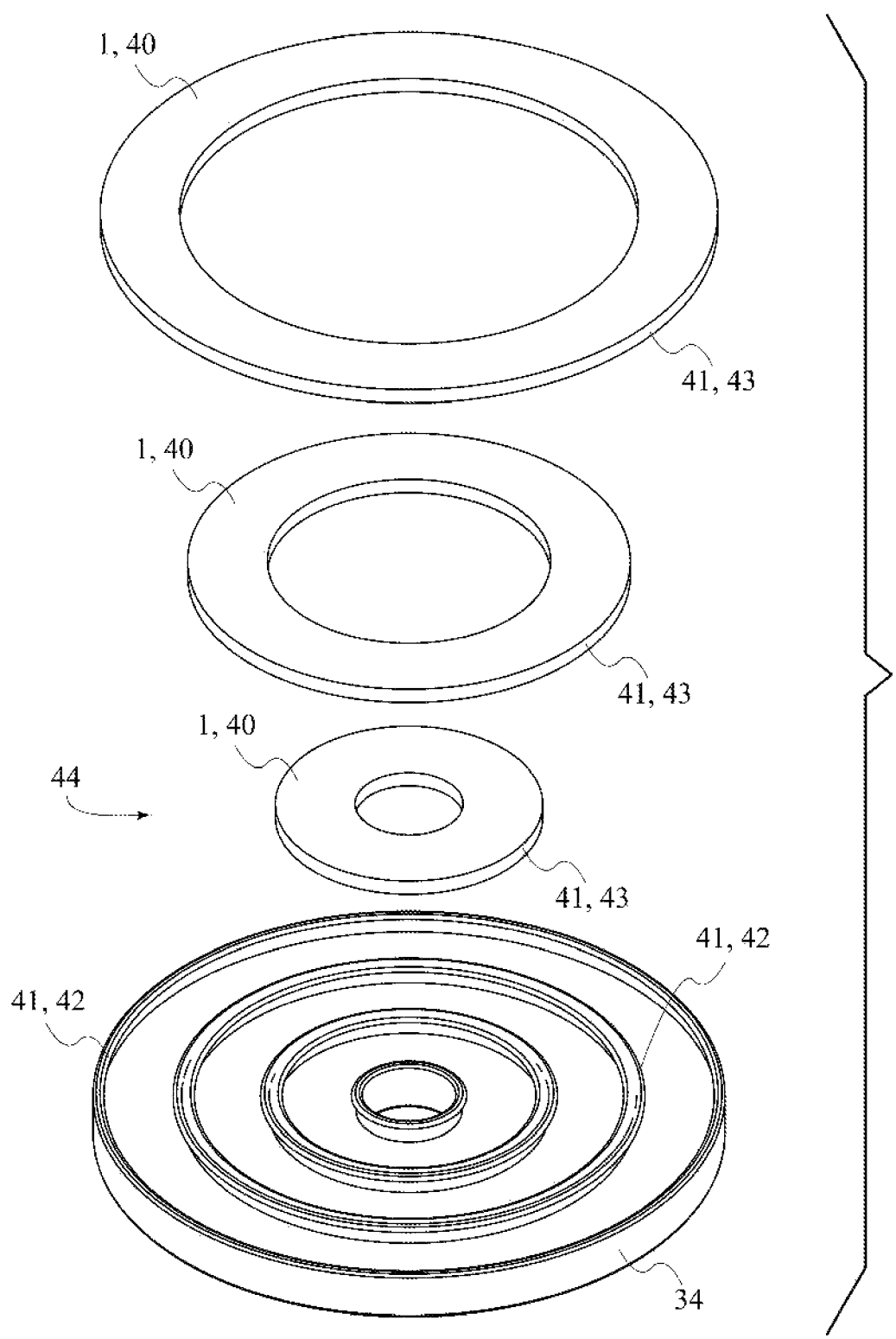
FIG. 30 is a top front exploded perspective view of the plurality of turnable wheels and the wheel casing of the present invention, wherein a fifth embodiment of the nested configuration of the plurality of turnable wheels in the wheel casing.
Figure 31:
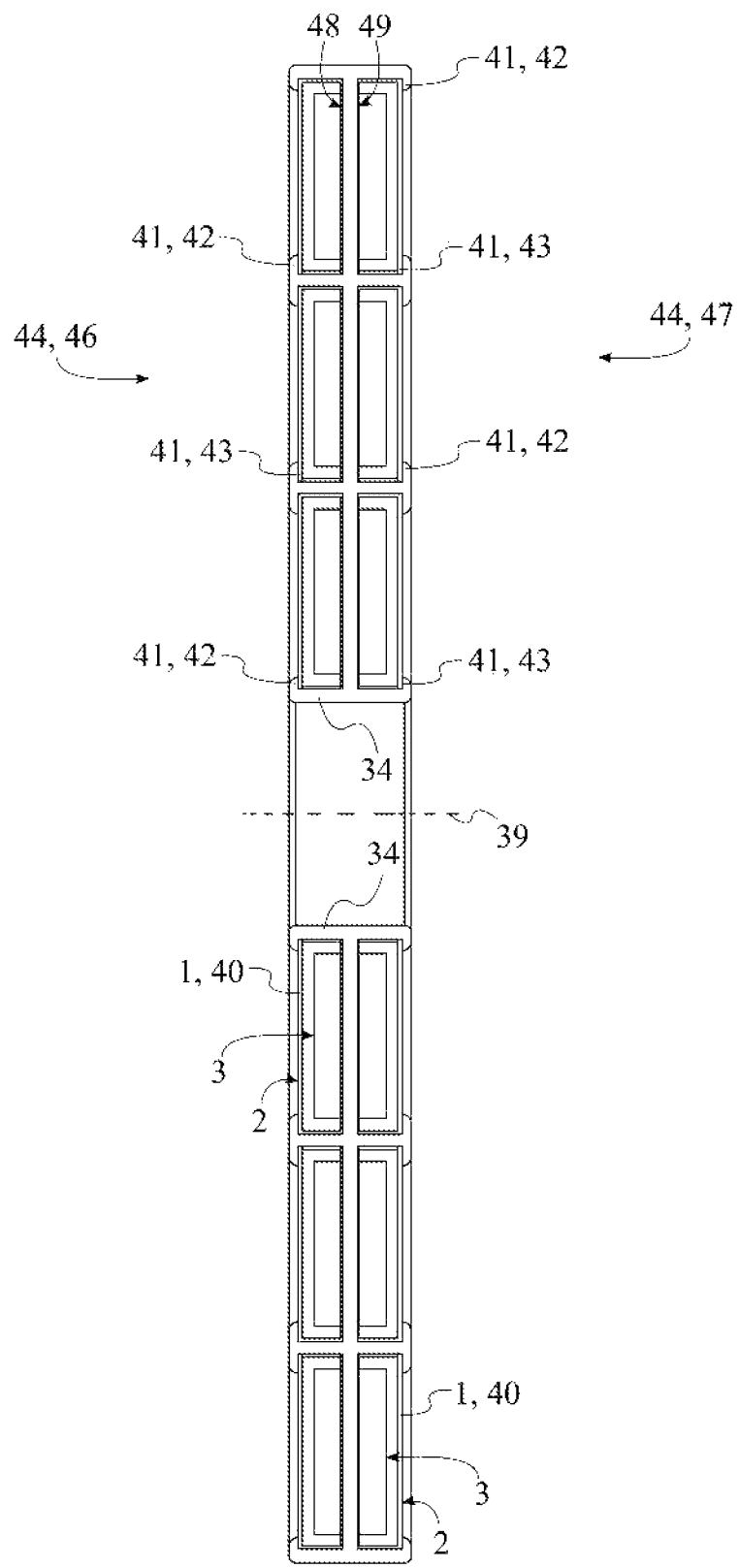
FIG. 31 is a schematic side view showing the fifth embodiment of the nested configuration of the plurality of turnable wheels in the wheel casing.

In the nested configurations, there may be circular walls molded into the wheel casing 34 to visually separate the plurality of turnable wheels 1, as can be seen in FIG. 22 through 31. In some embodiments, these circular walls may provide a surface for the plurality of paired annular tracks 41 to be alternatively mounted onto. As can be seen in FIGS. 30 and 31, the plurality of paired annular tracks 41 mounted sideways provides greater balance and stability for the rotational movement of the plurality of turnable wheels 1. In other embodiments where each turnable wheel is rotatably mounted into the wheel casing 34 in a stable manner, the separation walls are optional. Furthermore, any of the nested configurations can be attached back-to-back with one another to create a double-sided unit. Each side of the double-sided unit houses a set of nested turnable wheels that can be rotated individually. In this embodiment, the at least one demonstration mechanism 44 is a first demonstration mechanism 46 and a second demonstration mechanism 46, as can be seen in FIGS. 25, 29, and 31. Similarly, the wheel casing 34 may comprise a first casing face 48 and a second casing face 49. The first casing face 48 and the second casing face 49 are positioned opposite to each other about the wheel casing 34. In addition, the first demonstration mechanism 46 is positioned adjacent to the first casing face 48, while the second demonstration mechanism 47 is positioned adjacent to the second casing face 49. Furthermore, the double-sided version of the wheel casing 34 can be removably attached to the elongated frame 10.

Figure 32:
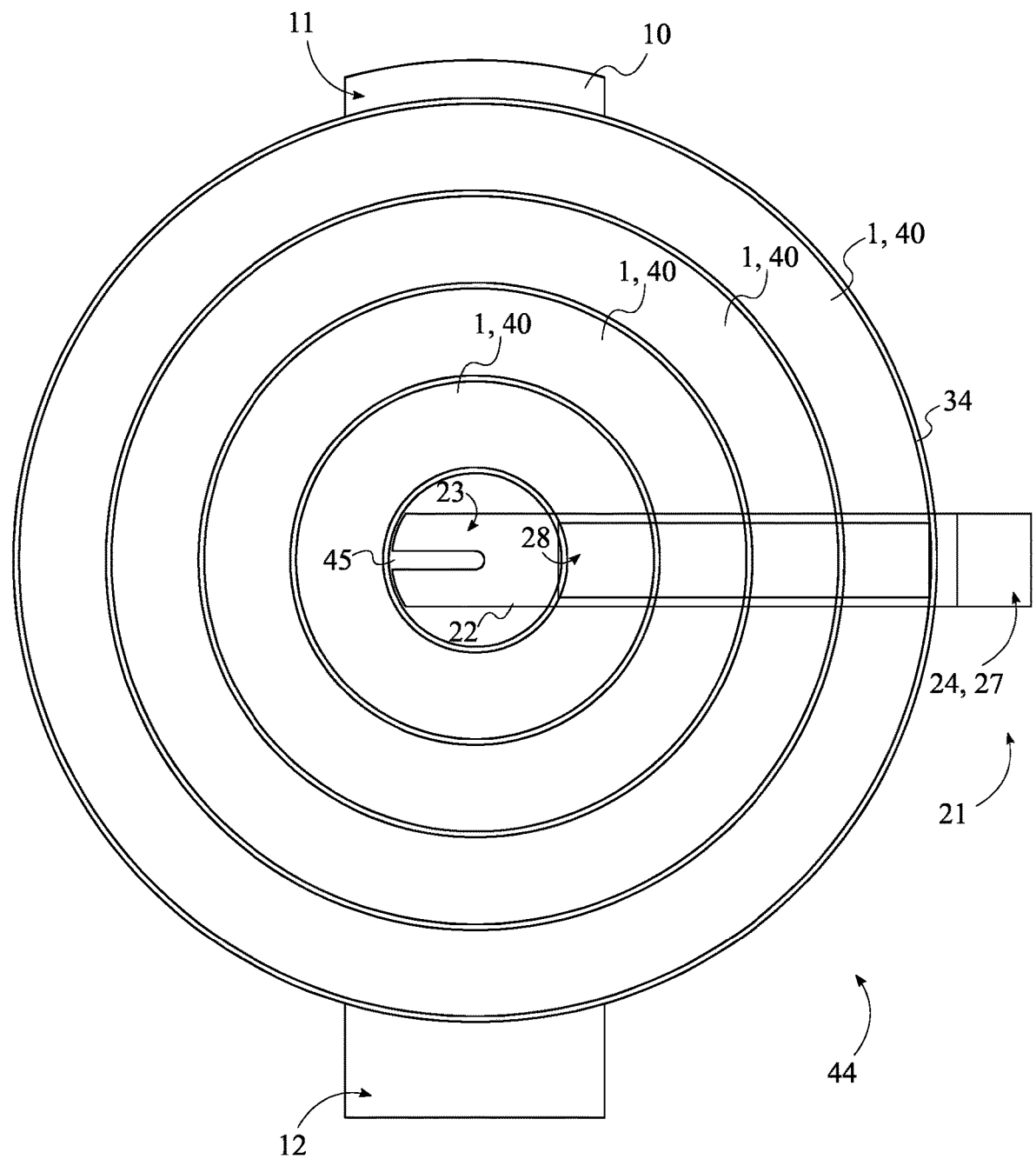
FIG. 32 is a front view of the at least one focusing window assembly of the present invention, wherein the positioning panel and the support arm are shown mounted onto the nested configuration of the plurality of turnable wheels and the elongated frame.
Figure 33:
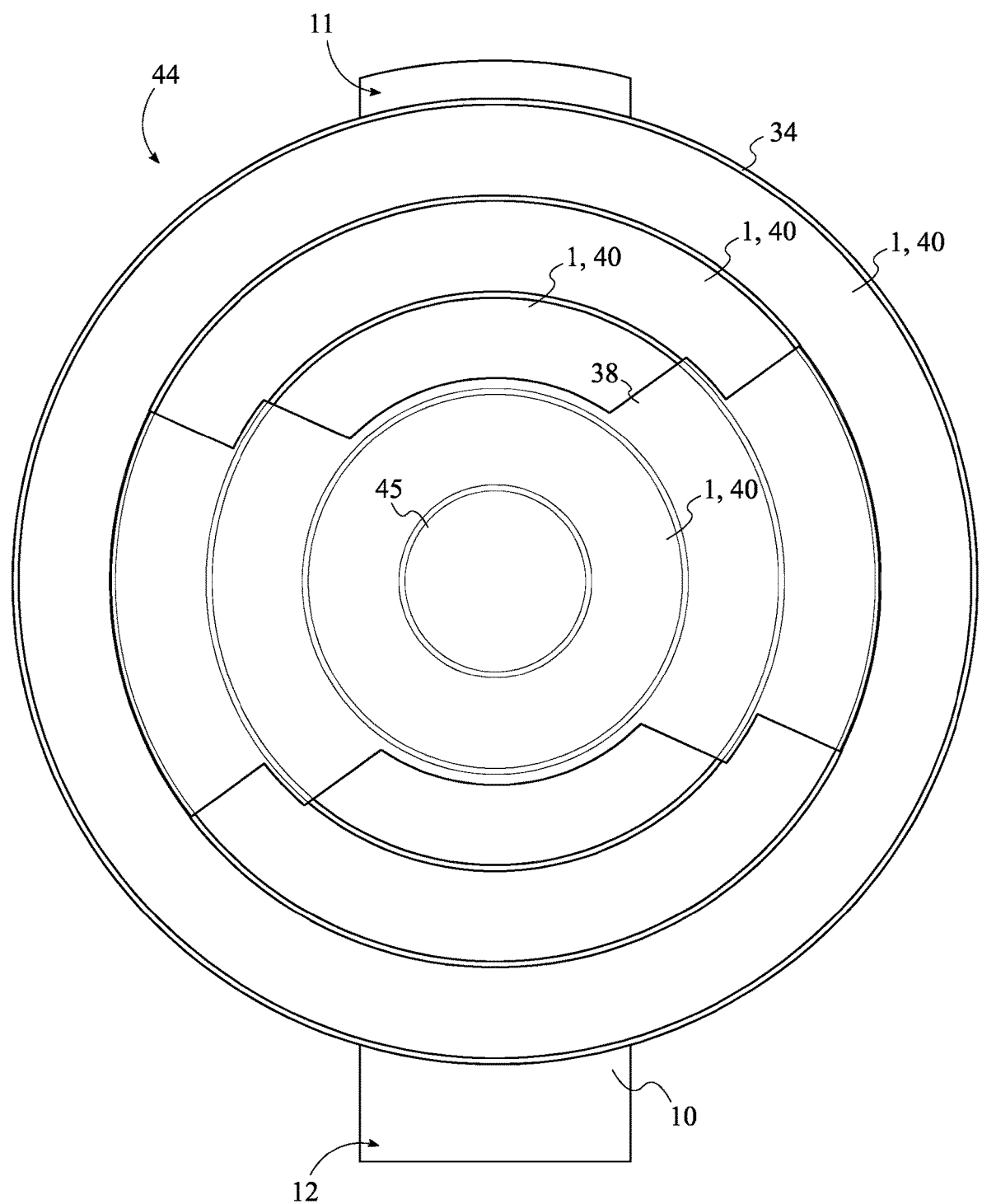
FIG. 33 is a front view of the annotatable transparent wheel of the present invention, wherein the annotatable transparent wheel is shown mounted onto the nested configuration of the plurality of turnable wheels.

In addition, for the nested configurations with a solid center, the annotatable transparent wheel 38 can then be concentrically mounted onto the wheel casing 34. On top of that, the positioning panel 22 with the tile-viewing window 28 may be further attached to said nested configurations. As can be seen in FIGS. 32 and 33, the first panel end 23 is mounted onto the solid center of the wheel casing 34. The second panel end 24 is mounted onto the outer wall of the wheel casing 34. This entire assembly can be mounted onto the elongated frame 10 or be used without the elongated frame 10. Furthermore, in all the nested configurations, several holes can be pre-drilled into the wheel casing 34. The lines and depths of drilling bore holes are such that if an object is inserted into such holes, the object will not interfere with the rotational movements of the turnable wheels. These holes enable further ornamental or functional items to be attached onto the outwards facing side of the wheel casing 34.

In addition, for the nested configurations with a hollow center, the mounting hub 45 can be placed in the hollow space, creating nested configurations with a removable center. As can be seen in FIGS. 32 and 33, the annotatable transparent wheel 38 and tile-viewing window 28 can then be mounted onto such configurations in a similar fashion to what is described in the preceding paragraph. For example, the annotatable transparent wheel 38 is coextensive with an outer wheel from the plurality of turnable wheels 1. The annotatable transparent wheel 38 is also positioned adjacent to the plurality of turnable wheels, opposite to the elongated frame. Then, the annotatable transparent wheel 38 is concentrically positioned with the wheel rotation axis 39. Thus, the annotatable transparent wheel 38 is rotatably mounted to the mounting hub 45.

For the at least one focusing window assembly 21 to be attached to the nested configuration of the plurality of turnable wheels 1, the positioning panel 22 is positioned adjacent to the writable wheel face 2 for each of the plurality of turnable wheels 1. As can be seen in FIGS. 32 and 33, the support arm 25 can also be positioned adjacent to the hidden wheel face 2 for each of the plurality of turnable wheels 1. Further, the first arm end 26 is laterally attached to the elongated frame 10, opposite to the plurality of turnable wheels 1. Then, to secure the positioning panel to the mounting hub 45, the first panel end 23 is attached onto the mounting hub 45. The first arm end 26 and the first panel end 23 are also positioned concentric with the wheel rotation axis 39. Further, the second arm end 27 and the second panel end 24 are peripherally attached to the wheel casing 34. The second arm end 27 and the second panel end 24 are also positioned adjacent to each other. This keeps the tile-viewing window 28 in a similar arrangement as the non-nested configuration of the present invention.

Exemplary Embodiment of a Teaching Method Using the Present Invention:

The present invention may include a method of teaching a new language. An educator teaches the contents of the plurality of display tiles 7, one at a time. The educator explains the meaning of the foreign word written on the display tile and shows the students the flip side of the display tile with the translated meaning of the foreign word in the student's native language. An illustrative image may be used in place of the translated word. After the educator has taught the content on a display tile, the display tile is attached to a turnable wheel from the plurality of turnable wheels 1, with the tile face with the target foreign language being exposed. The educator then introduces the next display tile in the same fashion, selecting words which can be combined with the previously introduced display tiles to form a chunk of meaning. The educator places subsequent display tiles on adjacent turnable wheels and rearranges the plurality of turnable wheels 1 to line up appropriate display tiles exposing the target foreign language words. The educator then instructs the students to speak and practice such strings of meaning-making words. Alternatively, the educator introduces words of the same part of speech as the previously introduced words. The educator then instructs the students to practice which can form a meaningful combination with the display tiles on the first turnable wheel. This way the students always can recall the previous tiles on the first turnable wheel for reinforcement as recall practice which enhances long-term memory.

As display tiles, the educator would have the students practice new combinations with the display tiles mounted on the plurality of turnable wheels 1 to form meaningful utterances. The educator can also select additional words (such as "but", "however", "if") from any of the secondary wheel sets to provide cues for language practice which enriches the sentence style or increases the sentence complexity. The cue selection can be intentional (purposeful spinning of the secondary wheel sets to land on the desired word) if the educator wishes the student to practice that language component—this step is called Deliberate Guidance. The educator can also let the students spin the secondary wheel sets in a random fashion, mimicking the randomness of real-life communication, effectively testing the student's ability to express themselves. The educator can repeat the previous steps until the targeted language concepts contained on all display tiles have been memorized.

Furthermore, after each of the attached display tiles have been practiced a few times in different semantic contexts, the educator can choose one or more display tiles to flip to expose the tile face with the native language. The students are then asked to express themselves in the target language based on the cues provided on the plurality of turnable wheels 1, essentially translating the native language display tiles into the target language in complete and grammatically correct utterances (this practice is called From Thoughts to Expression—the ultimate form of language performance). If the students forget a target language word or make a mistake during the translation practice, the educator then exposes the target language side of the display tile as a way of reteaching the word that the students have failed to translate correctly, and then have the students repeat the correct answer immediately (Immediate and In-Context Correction). These steps are repeated until the students can correctly express their thoughts in the target language. After the students have mastered all the content shown on the plurality of display tiles 7 on the plurality of turnable wheels 1, the educator can introduce additional language elements from any of the secondary wheel sets to enrich and/or test the students' ability to express themselves in even more diverse contexts.

The exemplary method is modular, reconfigurable, and adaptable to the individual student's ability. For stronger students, more display tiles can be shown to create more challenging practice, or new words added impromptu on the spot. Those words can be easily/naturally combined with the display tiles being practiced, or more complex combinations suggested through combinations with the secondary wheel sets. For weaker students, fewer display tiles can be shown to make the practice less challenging. Moreover, at any point when the students forget a word, the target display tile can be flipped to quickly reteach the words and reinforce the students' memory. This immediate feedback/correction mechanism is conducive for the students' vocabulary retention. Further, testing can be as simple as removing any given display tiles on the plurality of turnable wheels 1 and have the students to fill in the blanks. Multiple types of tests of varying levels of difficulties can be designed through manipulations of the display tiles and spinning the plurality of turnable wheels 1. Furthermore, the students can be given homework by simply practicing sentence-making, combining words on the display tiles. Thanks to a conscious choice of the display tiles and their arrangement, the students cannot produce an incorrect sentence structure. It is therefore errorless practice. Repeated errorless practice leads to fluency.

Gamification Method of the Present Invention:

The random spinning nature of the plurality of turnable wheels 1 often produces silly, unexpected sentences, which creates humor during the lesson and increases the students' engagement. An exemplary embodiment of the gamification method of the present invention involves incorporating a point system for the plurality of display tiles 7. For example, each display tile by default carries a point. As the students correctly generates an utterance, the students get awarded with points according to the number of display tiles used in the students' utterance. The point system can be modified to further incentivize the students, such as incorporating difficulty levels to the content on the plurality of display tiles 7 that awards more points. This can entice the students to create sentences incorporating more difficult display tiles. The point system provides a basis for many forms of competitive games that can be played between the students, all the while fostering the practice of the target language. Furthermore, the point system also provides a realistic measure of how much language a learner has practiced. Diligence practice is a precursor to language fluency, so the point system measures fluency level, especially when the students also record the amount of time taken for them to produce a given number of points (fluency is a function of utterance length, accuracy, diversity, and speech rate).

Exemplary Embodiment of a "Play Flat on Tabletop" Game:

Students draw random display tiles from the plurality of display tiles 7 and specially designed playing cards (each has bilingual language contents written or imprinted on one face). Rules of the game: the students draw at least one display tile or card, practice the target language with the person next to them, and the display tiles making up the produced utterance are attached onto the writable wheel face 2. Similar to the point rewarding system disclosed earlier, for each correct utterance, the student is awarded a certain number of points based on the number of tiles the student uses in their utterance(s) and the difficulty level or importance of those display tiles. The educator can manually assign higher point for tiles containing important or difficult words that the educator would like the students to practice. The next student/player in their turn draws random display tiles and cards from the piles, then finds way to produce new utterances, combining the display tiles already on the plurality of turnable wheels 1 and the display tiles the student has in their hands. Each student looking at the plurality of turnable wheels 1 will see an expression being constructed through the various arrangement of the display tiles. The student can spin the desired turnable wheel to help the student find the desired utterance(s) when the display tiles on the turnable wheels are rearranged, producing a large number of sentences.

Although the invention has been explained in relation to its preferred embodiment, it is to be understood that many other possible modifications and variations can be made without departing from the spirit and scope of the invention.

What is claimed is:

1. A rotatable language demonstration device comprising:
   at least one demonstration mechanism;
   a plurality of display tiles;
   an elongated frame;
   the at least one demonstration mechanism comprising a plurality of turnable wheels;
   each of the plurality of turnable wheels comprising a writable wheel face and a hidden wheel face;
   each adjacent wheel pair from the plurality of turnable wheels comprising a diametrically-smaller turnable wheel and a diametrically-larger turnable wheel;
   the elongated frame comprising a first frame end and a second frame end;
   a wheel rotation axis being positioned in between the first frame end and the second frame end;
   the wheel rotation axis being positioned perpendicular to the elongated frame;
   each of the plurality of turnable wheels being concentrically positioned with the wheel rotation axis;
   the writable wheel face being oriented away from the elongated frame;
   the hidden wheel face being oriented towards the elongated frame;
   each of the plurality of turnable wheels being rotatably mounted to the elongated frame about the wheel rotation axis;
   at least one specific display tile from the plurality of display tiles being removably attached onto the writable wheel face of a selected turnable wheel from the plurality of turnable wheels;
   a base dock;
   the base dock comprising a dock body and a plurality of docking slots;
   each of the plurality of docking slots traversing into the dock body;
   the plurality of docking slots being positioned offset from each other; and
   the second frame end being attached into a selected slot from the plurality of docking slots.

2. The rotatable language demonstration device as claimed in claim 1 comprising:
   each of the plurality of display tiles comprising a pair of tile faces and a magnetized tile body;
   the pair of tile faces being positioned opposite to each other about the magnetized tile body; and,
   at least one tile face from the pair of tile faces being a writable surface.

3. The rotatable language demonstration device as claimed in claim 1 comprising:
   at least one secondary board;
   the at least one secondary board comprising a board body, a writable board face, and a hidden board face;
   the writable board face and the hidden board face being positioned opposite to each other about the board body; and,
   the board body being attached adjacent to the first frame end.

4. The rotatable language demonstration device as claimed in claim 3 comprising:
   the writable board face being positioned parallel to the writable wheel face;
   the writable board face and the writable wheel face being oriented in a first direction;
   the hidden board face being positioned parallel to the hidden wheel face;
   the hidden board face and the hidden wheel face being oriented in a second direction; and,
   the second direction being oriented opposite to the first direction.

5. The rotatable language demonstration device as claimed in claim 3 comprising:
   the elongated frame further comprising a board-receiving slot;

the board-receiving slot being integrated into the first frame end; and, the board body being attached into the board-receiving slot.

6. The rotatable language demonstration device as claimed in claim 1 comprising:

at least one focusing window assembly;

the at least one focusing window assembly comprising a positioning panel, a support arm, and a tile-viewing window;

the positioning panel comprising a first panel end and a second panel end;

the support arm comprising a first arm end and a second arm end;

the positioning panel being positioned adjacent to the writable wheel face for each of the plurality of turnable wheels;

the support arm being positioned adjacent to the hidden wheel face for each of the plurality of turnable wheels;

the first arm end being laterally attached to the elongated frame, opposite to the plurality of turnable wheels;

the first panel end being laterally mounted to the elongated frame, adjacent to the plurality of turnable wheels;

the first arm end and the first panel end being positioned concentric with the wheel rotation axis;

the second arm end being attached onto the second panel end; and, the tile-viewing window being integrated into the positioning panel.

7. The rotatable language demonstration device as claimed in claim 6, wherein a length of the tile-viewing window extends from an inner wheel of the plurality of turnable wheels and an outer wheel of the plurality of turnable wheels.

8. The rotatable language demonstration device as claimed in claim 6, wherein the positioning panel is made of a transparent material.

9. The rotatable language demonstration device as claimed in claim 1 comprising:

the plurality of docking slots comprising a plurality of angle-bottomed slots and a plurality of flat-bottomed slots; and, the plurality of angle-bottomed slots being positioned adjacent to the plurality of flat-bottomed slots.

10. The rotatable language demonstration device as claimed in claim 1 comprising:

an annotatable transparent wheel;

the annotatable transparent wheel being coextensive with an outer wheel from the plurality of turnable wheels;

the annotatable transparent wheel being positioned amongst the plurality of turnable wheels, opposite to the elongated frame;

the annotatable transparent wheel being concentrically positioned with the wheel rotation axis; and, the annotatable transparent wheel being rotatably mounted to the elongated frame.

11. The rotatable language demonstration device as claimed in claim 1 comprising:

a main axle;

each of the plurality of turnable wheels being a disc-shaped wheel;

the hidden wheel face of the diametrically-smaller turnable wheel being positioned parallel and adjacent to the writable wheel face of the diametrically-larger turnable wheel;

the main axle being positioned colinear along the wheel rotation axis;

the main axle being mounted perpendicular to the elongated frame;

each of the plurality of turnable wheels being concentrically positioned with the main axle; and, each of the plurality of turnable wheels being rotatably mounted about the main axle.

12. The rotatable language demonstration device as claimed in claim 1 comprising:

a wheel casing;

each of the plurality of turnable wheels being an annulus-shaped wheel;

the writable wheel face for each of the plurality of turnable wheels being positioned coplanar to each other;

the hidden wheel face for each of the plurality of turnable wheels being positioned coplanar to each other;

the wheel casing being positioned concentric to the wheel rotation axis;

the wheel casing being positioned in between the plurality of turnable wheels and the elongated frame;

the wheel casing having a hollow center;

each of the plurality of turnable wheels being slidably connected about the wheel casing; and, the backing of the wheel casing being laterally mounted to the elongated frame.

13. The rotatable language demonstration device as claimed in claim 12 comprising:

the at least one demonstration mechanism further comprising a plurality of paired annular tracks;

each of the plurality of turnable wheels comprising an annulus-shaped body and a plurality of track guides;

the plurality of track guides being radially connected around the annulus-shaped body;

each of the plurality of paired annular tracks being positioned concentric with the wheel rotation axis;

the plurality of paired annular tracks being connected into wheel casing, opposite to the elongated frame; and, the plurality of track guides for each of the plurality of turnable wheels being slidably connected to a corresponding paired annular track from the plurality of paired annular tracks.

14. The rotatable language demonstration device as claimed in claim 12 comprising:

the at least one demonstration mechanism being a first demonstration mechanism and a second demonstration mechanism;

the wheel casing comprising a first casing face and a second casing face;

the first casing face and the second casing face being positioned opposite to each other about the wheel casing;

the first demonstration mechanism being positioned adjacent to the first casing face; and, the second demonstration mechanism being positioned adjacent to the second casing face.

15. The rotatable language demonstration device as claimed in claim 12 comprising:

a mounting hub; and, the mounting hub being centrally attached to the elongated frame through the hollow center of the wheel casing.

16. The rotatable language demonstration device as claimed in claim 15 comprising:

an annotatable transparent wheel;

the annotatable transparent wheel being coextensive with an outer wheel from the plurality of turnable wheels;

the annotatable transparent wheel being positioned adjacent to the plurality of turnable wheels, opposite to the elongated frame;

the annotatable transparent wheel being concentrically positioned with the wheel rotation axis; and, the annotatable transparent wheel being rotatably mounted to the mounting hub.

17. The rotatable language demonstration device as claimed in claim 15 comprising:

at least one focusing window assembly;

the at least one focusing window assembly comprising a positioning panel, a support arm, and a tile-viewing window;

the positioning panel comprising a first panel end and a second panel end;

the support arm comprising a first arm end and a second arm end;

the positioning panel being positioned adjacent to the writable wheel face for each of the plurality of turnable wheels;

the support arm being positioned adjacent to the hidden wheel face for each of the plurality of turnable wheels;

the first arm end being laterally attached to the elongated frame, opposite to the plurality of turnable wheels;

the first panel end being attached onto the mounting hub;

the first arm end and the first panel end being positioned concentric with the wheel rotation axis;

the second arm end and the second panel end being peripherally attached to the wheel casing;

the second arm end and the second panel end being positioned adjacent to each other; and, the tile-viewing window being integrated into the positioning panel.

18. The rotatable language demonstration device as claimed in claim 17, wherein a length of the tile-viewing window extends from an inner wheel of the plurality of turnable wheels and an outer wheel of the plurality of turnable wheels.

19. The rotatable language demonstration device as claimed in claim 17, wherein the positioning panel is made of a transparent material.

\* \* \* \* \*